（12) United States Patent
Belenkil et al.

(10) Patent No.: US 10,969,199 B2
(45) Date of Patent: Apr. 6, 2021

(54) CROSSWIND CORRECTION FOR SNIPER RIFLE AIMPOINT

(71) Applicants: Mikhail Belenkil, San Diego, CA (US); Timothy Brinkley, San Diego, CA (US)

(72) Inventors: Mikhail Belenkil, San Diego, CA (US); Timothy Brinkley, San Diego, CA (US)

( * ) Notice: Subject to any disclaimer, the term of this patent is extended or adjusted under 35 U.S.C. 154(b) by 111 days.

(21) Appl. No.: 15/192,879

(22) Filed: Jun. 24, 2016

(65) Prior Publication Data

US 2019/0242676 A1    Aug. 8, 2019

(51) Int. Cl.
*F41G 3/08*    (2006.01)
*G01P 5/26*    (2006.01)
*F41G 3/16*    (2006.01)
*F41G 3/06*    (2006.01)

(52) U.S. Cl.
CPC .............. *F41G 3/08* (2013.01); *F41G 3/06* (2013.01); *F41G 3/165* (2013.01); *G01P 5/26* (2013.01)

(58) Field of Classification Search
CPC ........................................................ F41G 3/08
See application file for complete search history.

(56) References Cited

U.S. PATENT DOCUMENTS

2016/0202282 A1*  7/2016  Maryfield ............ G01S 17/58
                                                   356/28
2016/0290765 A1* 10/2016  Maryfield ............ G02B 27/36

\* cited by examiner

*Primary Examiner* — John E Breene
*Assistant Examiner* — Jeffrey C Morgan
(74) *Attorney, Agent, or Firm* — John R. Ross

(57) ABSTRACT

An optical system for providing crosswind aim point correction for a sniper rifles and similar weapons comprising an optical transmitter, an optical receiver, a display device and a processor. The optical transmitter produces a collimated laser beam for illuminating a spot on the target. The optical receiver receives optical signals transmitted by the optical transmitter and scattered back from the target and converts the optical signals into time varying electrical signals. The processor processes the time varying electrical signals to determine a path weighted average crosswind. The processor is equipped with software that permits it to calculate the path-weighted average crosswind utilizing at least three different methods.

14 Claims, 22 Drawing Sheets

Fig. 2    PRIOR ART
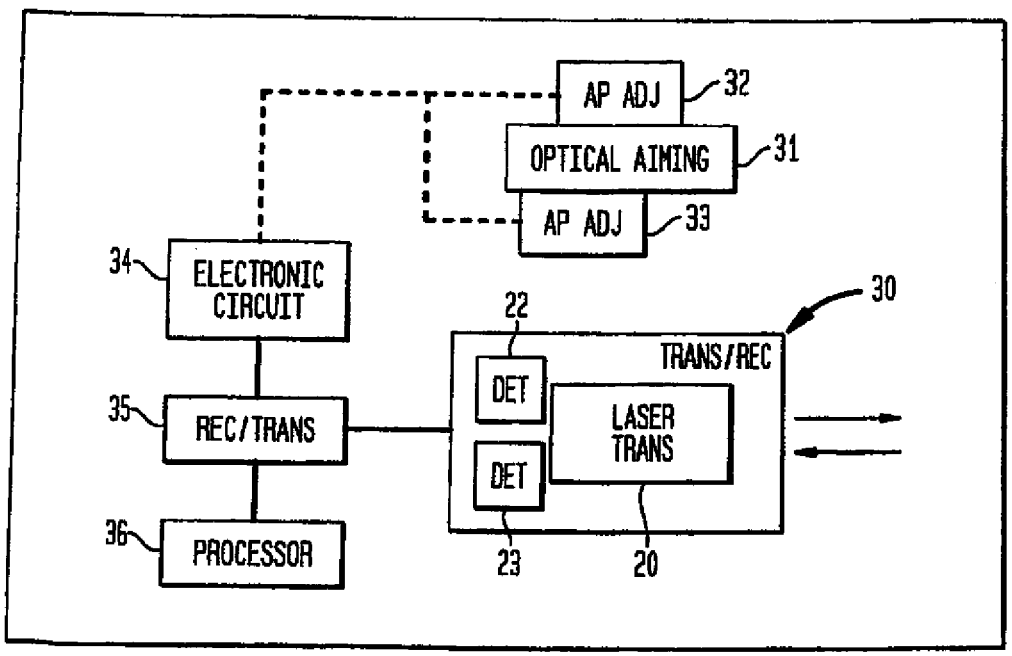
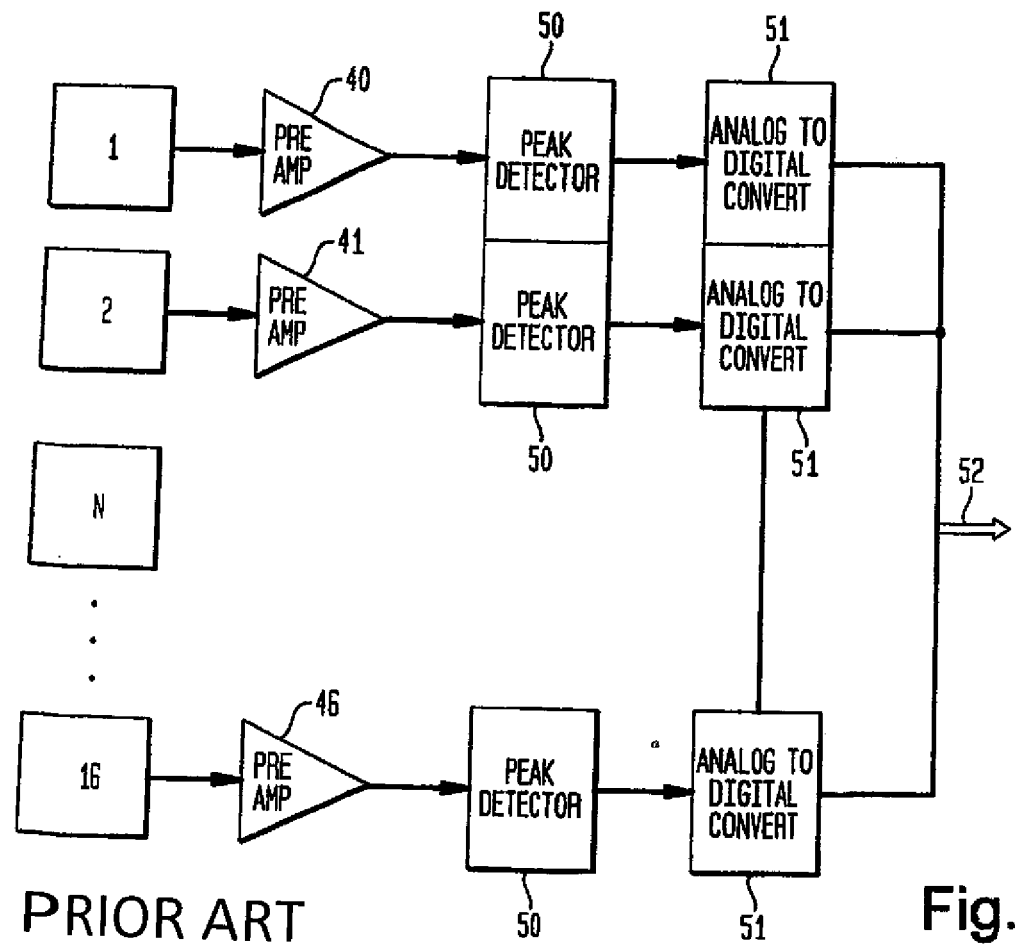
PRIOR ART    Fig. 3

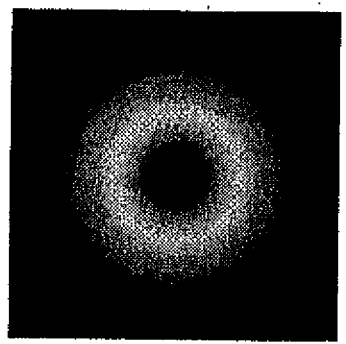 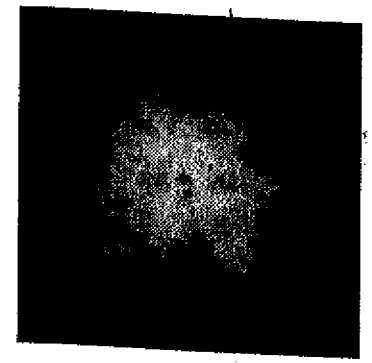
Fig. 8A  FIG. 8B
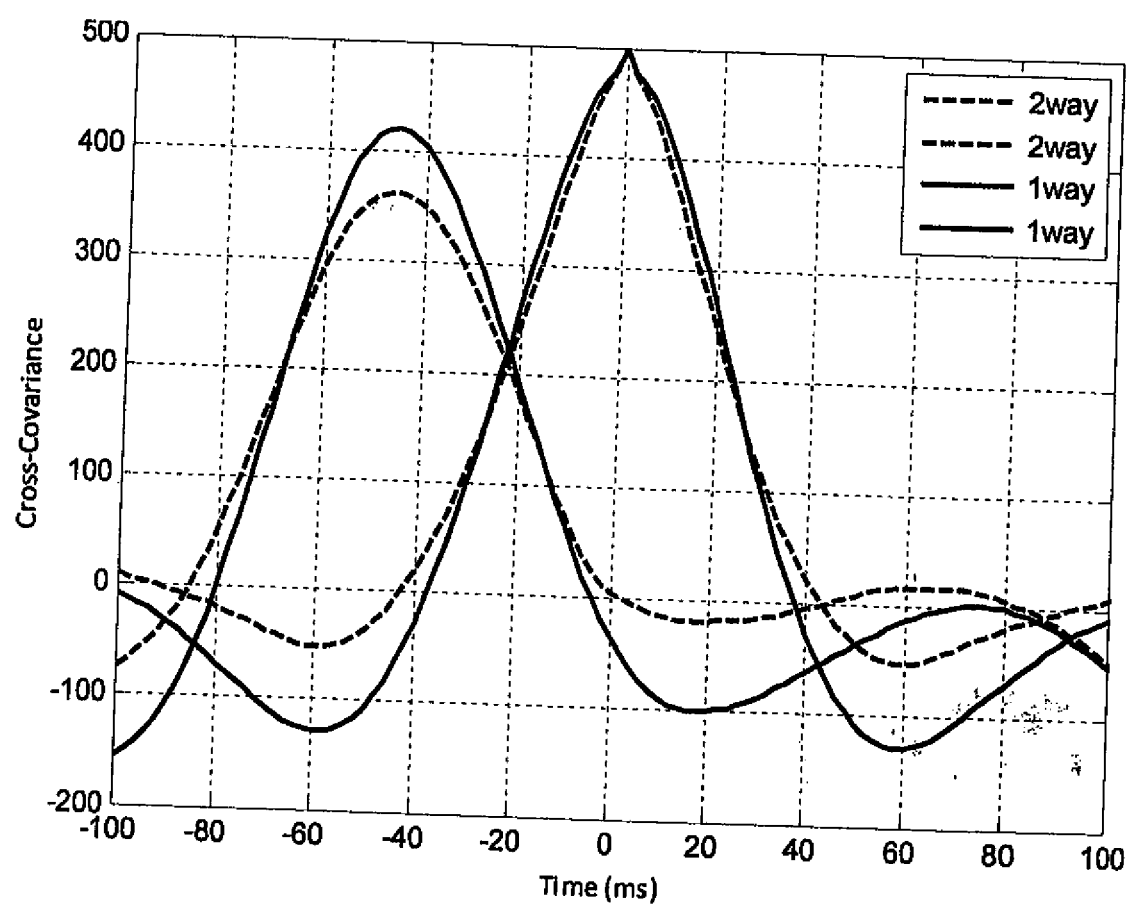
Fig. 9

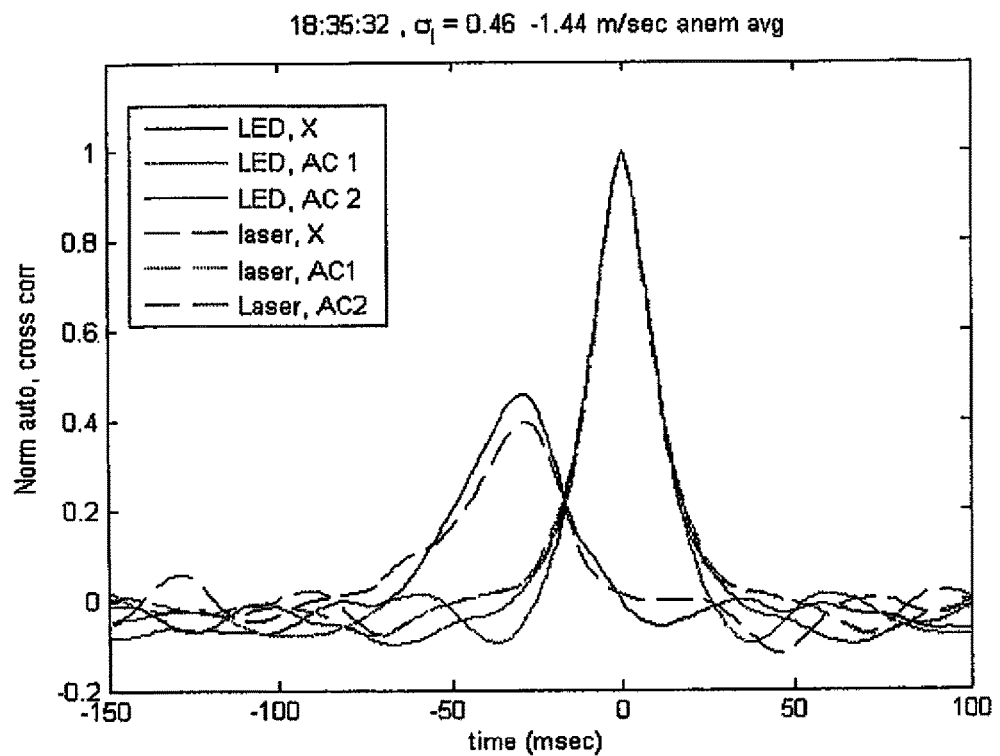
FIG. 10A
Fig. 10B
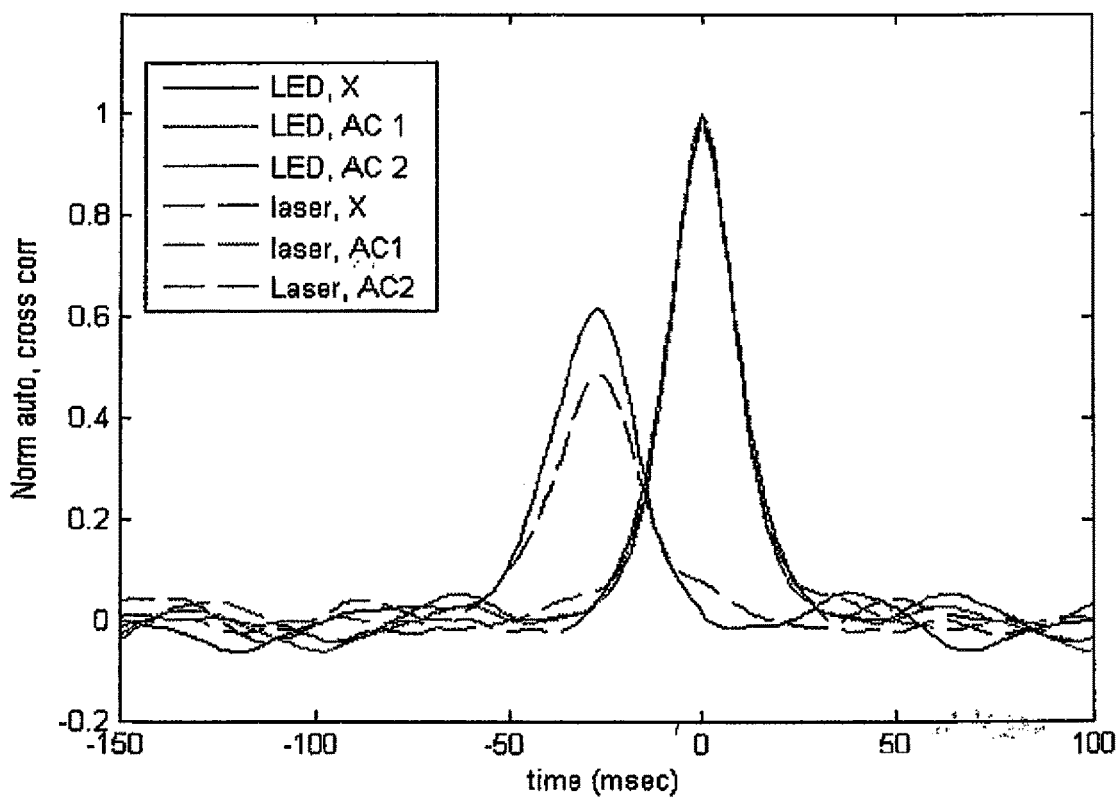

FIG. 18

 OSXG Brass board Upgrade

Upgraded Brass board: Laser collimator in the center

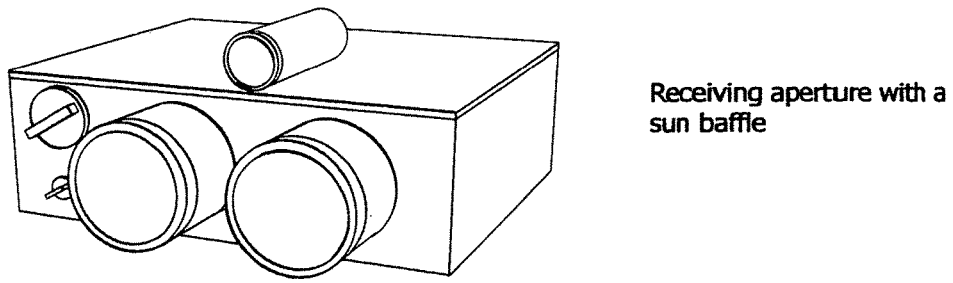

Laser with collimator

Receiving aperture with a sun baffle

- 1550 nm fiber laser, 1W with collimated optics, beam divergence is 150 μrad
- SWIR FLIR camera, 640x480 pixels,
- Bandpass filter 10 nm centered at 1550 nm
- Two 20x20 pixels regions of interest (ROIs) at the FPA for proceeding of two received signals
- Two receiving apertures, 35 mm diameter placed side by side with baffles

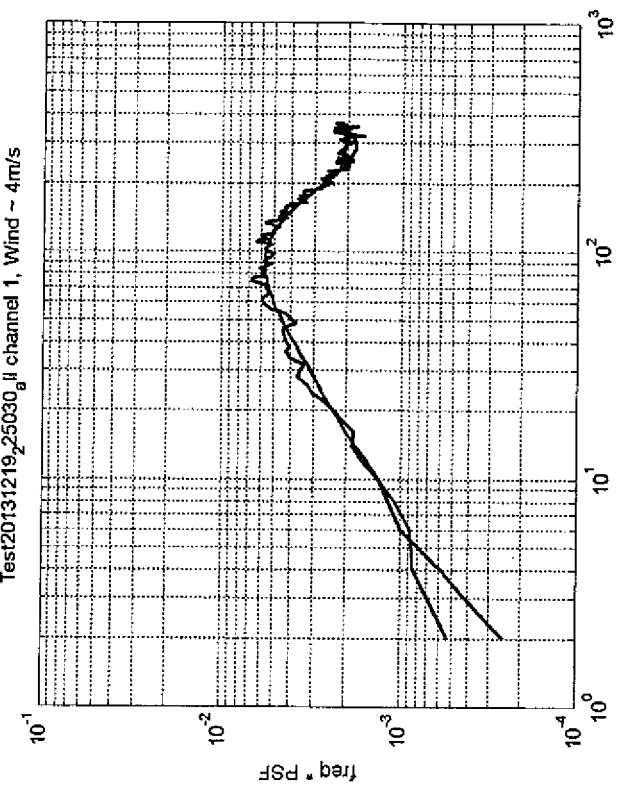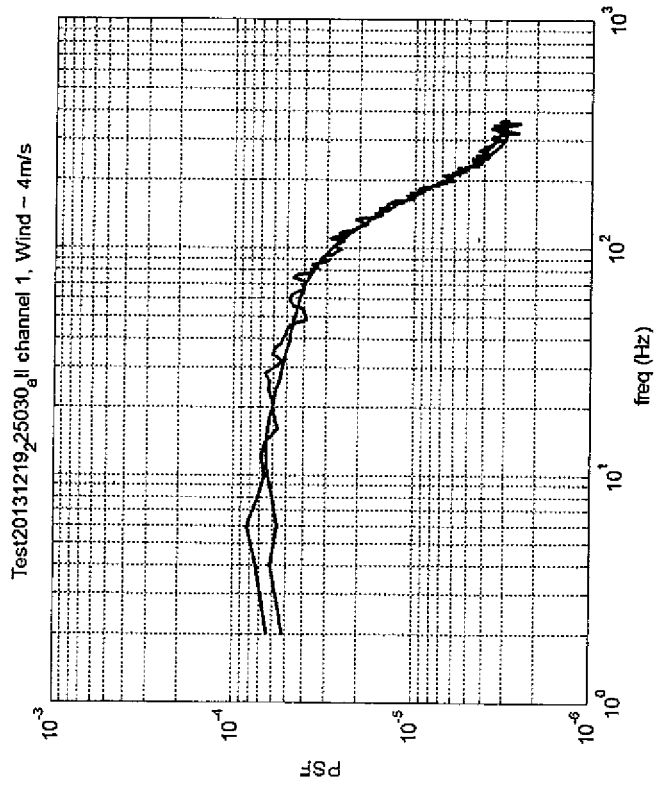
FIG. 19A
FIG. 19B
8th order polynomial curve fit

8th order polynomial curve fit

CROSSWIND CORRECTION FOR SNIPER RIFLE AIMPOINT

FEDERAL SUPPORTED RESEARCH

This invention was reduced to practice under a Cubic Defense Applications Inc.—Trex Enterprises Corporation subcontract (Number A97414) under DARPA—Cubic prime contract (Number HR011-12-C-0088) and the United States Government has rights in the invention. Sniper rifles equipped according to the present invention permit one-shot "kill" success rate of about 78 percent at distances of 0.943 kilometers and 65 percent at 1.326 kilometers. Applicants recommend that this application be examined under the 35 U.S.C. 181 secrecy rules of the USPTO.

FIELD OF THE INVENTION

The present invention relates to sniper rifles and in particular to systems and methods for crosswind correction of sniper rifle aim point.

BACKGROUND OF THE INVENTION

Optical Sensors for Measuring Crosswind Speed

When a light beam passes through a turbulent atmosphere the turbulence will produce scintillations patterns in the light beam which can be recorded with optical instruments. It has been known for more than 62 years that when two approximately parallel light beams separated by a few centimeters pass through the turbulent atmosphere, the scintillation patterns in the downwind beam recorded by two corresponding optical detectors will be delayed relative to the scintillations in the upwind beam. By correlating recorded signals it may be possible to determine the delay of the downwind patterns relative to the upwind patterns. The time delay divided by the separation of the two beams can often provide a good estimate of the crosswind speed.

Variance and Standard Deviation

Techniques for correlating the signals typically involve calculations of the variance, covariance and standard deviation of the intensity values of the light in the parallel or approximately parallel light beams. Basically, the variance of a population of values is the average of the squared deviation of the values from their average value. And the standard deviation is the square root of the variation. For example, consider the following set of numbers: 2. 4, 4, 4, 5, 5, 7 and 9. The average is 5. The sum of the square of the differences between the average value and the eight values is 40 and the average value of the squares of the differences is 4 which is the variance of the population of values. The standard deviation of the population of values is the square root of the variance which is 2.

Covariance

In probability theory and statistics, covariance is a measure of how much two random variables change together. If the greater values of one variable mainly correspond with the greater values of the other variable, and the same holds for the lesser values, i.e., the variables tend to show similar behavior, the covariance is positive. In the opposite case, when the greater values of one variable mainly correspond to the lesser values of the other, i.e., the variables tend to show opposite behavior, the covariance is negative. The sign of the covariance therefore shows the tendency in the linear relationship between the variables. The magnitude of the covariance is not easy to interpret. The normalized version of the covariance, the correlation coefficient, however, shows by its magnitude the strength of the linear relation.

A distinction must be made between (1) the covariance of two random variables, which is a population parameter that can be seen as a property of the joint probability distribution, and (2) the sample covariance, which serves as an estimated value of the parameter.

The covariance between two jointly distributed real-valued random variables X and Y with finite second moments is defined as:

$$\mathrm{cov}(X,Y) = E[(X-E[X])(Y-E[Y])],$$

where E[X] is the expected value of X, also known as the mean of X. By using the linearity property of expectations, this can be simplified to $$\begin{aligned}\mathrm{cov}(X,Y) &= E[(X-E[X])(Y-E[Y])] \\ &= E[XY - XE[Y] - E[X]Y + E[X]E[Y]] \\ &= E[XY] - E[X]E[Y] - E[X]E[Y] + E[X]E[Y] \\ &= E[XY] - E[X]E[Y].\end{aligned}$$

However, when $E[XY] \approx E[X]E[Y]$, this last equation is prone to catastrophic cancellation when computed with floating point arithmetic and thus should be avoided in computer programs when the data has not been centered before Numerically stable algorithms should be preferred in this case.

For random vectors $X \in \mathbb{R}^m$ and $Y \in \mathbb{R}^n$, the m×n cross covariance matrix (also known as dispersion matrix or variance-covariance matrix,[4] or simply called covariance matrix) is equal to $$\begin{aligned}\mathrm{cov}(X,Y) &= E[(X-E[X])(Y-E[Y])^T] \\ &= E[XY^T] - E[X]E[Y]^T,\end{aligned}$$

where $m^T$ is the transpose of the vector (or matrix) m.

The (i,j)-th element of this matrix is equal to the covariance $\mathrm{Cov}(X_i, Y_j)$ between the i-th scalar component of X and the j-th scalar component of Y. In particular, Cov(Y, X) is the transpose of Cov(X, Y).

For a vector $X = [X_1 \ X_2 \ \ldots \ X_m]^T$ of m jointly distributed random variables with finite second moments, its covariance matrix is defined as $$\Sigma(X) = \sigma(X,X).$$

Random variables whose covariance is zero are called uncorrelated. Similarly, random vectors whose covariance matrix is zero in every entry outside the main diagonal are called uncorrelated.

The units of measurement of the covariance Cov(X, Y) are those of X times those of Y. By contrast, correlation coefficients, which depend on the covariance, are a dimensionless measure of linear dependence. (In fact, correlation coefficients can simply be understood as a normalized version of covariance.)

If each variable has a finite set of equal-probability values, $x_i$ and $y_i$ respectively for $i=1, \ldots, n$, then the covariance can be equivalently written in terms of the means $E(X)$ and $E(Y)$ as $$\mathrm{cov}(X, Y) = \frac{1}{n}\sum_{i=1}^{n}(x_i - E(X))(y_i - E(Y)).$$

It can also be equivalently expressed, without directly referring to the means, as:

$$\mathrm{cov}(X, Y) = \frac{1}{n^2}\sum_{i=1}^{n}\sum_{j=1}^{n}\frac{1}{2}(x_i - x_j)\cdot(y_i - y_j) = \frac{1}{n^2}\sum_{i}\sum_{j>i}(x_i - x_j)\cdot(y_i - y_j).$$

Variance is a special case of the covariance when the two variables are identical:

$\mathrm{cov}(X,X) = \mathrm{Var}(X) \equiv \sigma^2(X).$

If X, Y, W, and V are real-valued random variables and a, b, c, d are constant ("constant" in this context means non-random), then the following facts are a consequence of the definition of covariance:

$\sigma(X,a)=0$ $\sigma(X,X)=\sigma^2(X)$ $\sigma(X,Y)=\sigma(Y,X)$ $\sigma(aX,bY)=ab\sigma(X,Y)$ $\sigma(X+a,Y+b)=\sigma(X,Y)$ $\sigma(aX+bY,cW+dV)=ac\sigma(X,W)+ad\sigma(X,V)+bc\sigma(Y,W)+bd\sigma(Y,V)$ For a sequence $X_1, \ldots, X_n$ of random variables, and constants $a_1, \ldots, a_n$, we have $$\sigma^2\left(\sum_{i=1}^{n}a_i X_i\right) = \sum_{i=1}^{n}a_i^2 \sigma^2(X_i) + 2\sum_{i,j:i<j}a_i a_j \sigma(X_i, X_j) = \sum_{i,j}a_i a_j \sigma(X_i, X_j)$$

Let X be a random vector with covariance matrix $\Sigma(X)$, and let A be a matrix that can act on X. The covariance matrix of the vector AX is:

$\Sigma(AX)=A\Sigma(X)A^T.$

This is a direct result of the linearity of expectation and is useful when applying a linear transformation, such as a whitening transformation, to a vector.

If X and Y are independent, then their covariance is zero. This follows because under independence, $E[XY]=E[X]\cdot E[Y].$ The converse, however, is not generally true. For example, let X be uniformly distributed in [−1, 1] and let $Y=X^2$. Clearly, X and Y are dependent, but $\sigma(X, Y) = \sigma(X, X^2)$ $= E[X \cdot X^2] - E[X] \cdot E[X^2]$ $= E[X^3] - E[X]E[X^2]$ $= 0 - 0 \cdot E[X^2]$ $= 0.$ In this case, the relationship between Y and X is non-linear, while correlation and covariance are measures of linear dependence between two variables. This example shows that if two variables are uncorrelated, that does not in general imply that they are independent. However, if two variables are jointly normally distributed (but not if they are merely individually normally distributed), uncorrelatedness does imply independence.

Many of the properties of covariance can be extracted elegantly by observing that it satisfies similar properties to those of an inner product:
1. bilinear: for constants a and b and random variables X, Y, Z, $\sigma(aX+bY, Z)=a\,\sigma(X, Z)+b\,\sigma(Y, Z)$;
2. symmetric: $\sigma(X, Y)=\sigma(Y, X)$;
3. positive semi-definite: $\sigma^2(X)=\sigma(X, X)\geq 0$ for all random variables X, and $\sigma(X, X)=0$ implies that X is a constant random variable (K).

In fact these properties imply that the covariance defines an inner product over the quotient vector space obtained by taking the subspace of random variables with finite second moment and identifying any two that differ by a constant. (This identification turns the positive semi-definiteness above into positive definiteness.) That quotient vector space is isomorphic to the subspace of random variables with finite second moment and mean zero; on that subspace, the covariance is exactly the $L^2$ inner product of real-valued functions on the sample space.

As a result for random variables with finite variance, the inequality $|\sigma(X,Y)| \leq \sqrt{\sigma^2(X)\sigma^2(Y)}$ holds via the Cauchy-Schwarz inequality.

Proof: If $\sigma^2(Y)=0$, then it holds trivially. Otherwise, let random variable $$Z = X - \frac{\sigma(X, Y)}{\sigma^2(Y)}Y.$$

Then we have $$0 \leq \sigma^2(Z) = \sigma\left(X - \frac{\sigma(X, Y)}{\sigma^2(Y)}Y, X - \frac{\sigma(X, Y)}{\sigma^2(Y)}Y\right)$$

$$= \sigma^2(X) - \frac{(\sigma(X, Y))^2}{\sigma^2(Y)}.$$

The sample covariance of N observations of K variables is the K-by-K matrix $\overline{q}=[[q_{jk}]]$ with the entries $$q_{jk} = \frac{1}{N-1}\sum_{i=1}^{N}(X_{ij} - \overline{X}_j)(X_{ik} - \overline{X}_k),$$

which is an estimate of the covariance between variable j and variable k.

The sample mean and the sample covariance matrix are unbiased estimates of the mean and the covariance matrix of the random vector X, a row vector whose jth element (j=1, . . . , K) is one of the random variables. The reason the sample covariance matrix has N−1 in the denominator rather than N is essentially that the population mean E(X) is not known and is replaced by the sample mean $\overline{X}$. If the population mean E(X) is known, the analogous unbiased estimate is given by $$q_{jk} = \frac{1}{N} \sum_{i=1}^{N} (X_{ij} - E(X_j))(X_{ik} - E(X_k))$$

The covariance is sometimes called a measure of "linear dependence" between the two random variables. That does not mean the same thing as in the context of linear algebra (see linear dependence). When the covariance is normalized, one obtains the correlation coefficient. From it, one can obtain the Pearson coefficient, which gives the goodness of the fit for the best possible linear function describing the relation between the variables. In this sense covariance is a linear gauge of dependence.

Auto-Covariance

In probability and statistics, given a stochastic process $X=(X_t)$, the auto-covariance is a function that gives the covariance of the process with itself at pairs of time points. With the usual notation E for the expectation operator, if the process has the mean function $\mu_t = E[X_t]$, then the autocovariance is given by $$C_{XX}(t,s) = \text{cov}(X_t, X_s) = E[(X_t - \mu_t)(X_s - \mu_s)] = E[X_t X_s] - \mu_t \mu_s.$$

Autocovariance is related to the more commonly used auto-correlation of the process in question.

In the case of a random vector $X=(X_1, X_2, \ldots, X_n)$, the auto-covariance would be a square n by n matrix $C_{XX}$ with entries $C_{XX}(j, k) = \text{cov}(X_j, X_k)$. This is commonly known as the covariance matrix or matrix of covariances of the given random vector.

If X(t) is stationary process, then the following are true:

$$\mu_t = \mu_s = \mu \text{ for all } t, s$$

and $$C_{XX}(t,s) = C_{XX}(s-t) = C_{XX}(\tau)$$

where $$\tau = |s-t|$$

is the lag time, or the amount of time by which the signal has been shifted.

As a result, the auto-covariance becomes:

$$C_{XX}(\tau) = E[(X(t) - \mu)(X(t+\tau) - \mu)]$$
$$= E[X(t)X(t+\tau)] - \mu^2$$
$$= \sigma^2 R_{XX}(\tau) - \mu^2,$$

where $R_{XX}(\tau)$ is the autocorrelation of the signal with variance $\sigma^2$. Some authors do not normalize the autocorrelation function.[1] In those literatures, $C_{XX}(\tau) = R_{XX}(\tau) - \mu^2$.

When normalized by dividing by the variance $\sigma^2$, the auto-covariance C becomes the auto-correlation coefficient function c,[2]

$$c_{XX}(\tau) = \frac{C_{XX}(\tau)}{\sigma^2}.$$

However, often the auto-covariance is called autocorrelation even if this normalization has not been performed.

The auto-covariance can be thought of as a measure of how similar a signal is to a time-shifted version of itself with an auto-covariance of $\sigma^2$ indicating perfect correlation at that lag. The normalization with the variance will put this into the range [−1, 1].

The auto-covariance of a linearly filtered process $Y_t$ $$Y_t = \sum_{k=-\infty}^{\infty} a_k X_{t+k}$$

is $$C_{YY}(\tau) = \sum_{k,l=-\infty}^{\infty} a_k a_l^* C_{XX}(\tau + k - l).$$

In probability and statistics, given two stochastic processes $X=(X_t)$ and $Y=(Y_t)$, the cross-covariance is a function that gives the covariance of the one process with the other at pairs of time points. With the usual notation E for the expectation operator, if the processes have the mean functions $\mu_t = E[X_t]$ and $\nu_t = E[Y_t]$, then the cross-covariance is given by $$C_{XY}(t,s) = \text{cov}(X_t, Y_s) = E[(X_t - \mu_t)(Y_s - \nu_s)] = E[X_t Y_s] - \mu_t \nu_s.$$

Cross-Covariance

Cross-covariance is related to the more commonly used cross-correlation of the processes in question.

In the case of two random vectors $X=(X_1, X_2, \ldots, X_n)$ and $Y=(Y_1, Y_2, \ldots, Y_n)$, the cross-covariance would be a square n by n matrix $C_{XY}$ with entries $C_{XY}(j, k) = \text{cov}(X_j, Y_k)$.

Thus the term cross-covariance is used in order to distinguish this concept from the "covariance" of a random vector X, which is understood to be the matrix of covariances between the scalar components of X itself.

In signal processing, the cross-covariance is often called cross-correlation and is a measure of similarity of two signals, commonly used to find features in an unknown signal by comparing it to a known one. It is a function of the relative time between the signals, is sometimes called the sliding dot product, and has applications in pattern recognition and cryptanalysis.

For random vectors X and Y, each containing random elements whose expected value and variance exist, the cross-covariance matrix of X and Y is defined by $$\text{cov}(X,Y) = E[(X - \mu_X)(Y - \mu_Y)'],$$

where $\mu_X$ and $\mu_Y$ are vectors containing the expected values of X and Y. The vectors X and Y need not have the same dimension, and either might be a scalar value. Any element of the cross-covariance matrix is itself a "cross-covariance".

For example, if $X=(X_1, X_2, X_3)$ and $Y=(Y_1, Y_2)$ are random vectors, then Cov(X, Y) is a 3×2 matrix whose ij-th entry is $\text{Cov}(X_i, Y_j)$.

The cross-covariance is also relevant in signal processing where the cross-covariance between two wide-sense stationary random processes can be estimated by averaging the product of samples measured from one process and samples measured from the other (and its time shifts). The samples included in the average can be an arbitrary subset of all the samples in the signal (e.g., samples within a finite time window or a sub-sampling of one of the signals). For a large number of samples, the average converges to the true covariance.

Cross-covariance may also refer to a "deterministic" cross-covariance between two signals. This consists of summing over all time indices. For example, for discrete signals $f_i$ and $g_i$ the cross-covariance is defined as $$(f * g)_i \stackrel{def}{=} \sum_j f_j^* g_{i+j}$$

where the asterisk indicates that the complex conjugate is taken when the signals are complex-valued.

For continuous functions $f(x)$ and $g(x)$ the (deterministic) cross-covariance is defined as $$(f*g)(x) \stackrel{def}{=} \int f^*(t)g(x+t)dt$$

The cross-covariance of two signals is related to the convolution by:

$$f(t)*g(t)=f^*(-t)*g(t),$$

Early Crosswind Measurement Papers

Several early crosswind papers and patent documents describe techniques for measuring crosswind speed with wind measurement optical equipment. These papers in general record the intensity of parallel or approximately parallel light beams with a photodetector to obtain sets of intensity values for each of the two beams. Turbulent eddies carried by the crosswind produce random scintillations in the recorded sets of intensity values. The intensity fluctuations in the two beams are recorded and correlated as a function of time to determine when the fluctuations in the upwind beam correlates with the fluctuations in the downwind beam. Since turbulent eddies are carried by the crosswind, the fluctuations in the downwind beam are delayed relative to the fluctuations in the upwind beam. The separation of the two beams divided by the timr delay in the correlated fluctuations is an estimate of the crosswind velocity. These early crosswind papers use intensity fluctuations in the two parallel or approximately parallel light beams utilizing auto-covariance and cross covariance functions. The path-integrated crosswind is determined by processing time series of the two signals received by spatially-separated receive apertures.

The auto-covariance for each of the two sets of intensity values is the normalized sum of the product of (1) the difference between (a) each intensity value and (b) the average intensity value and (2) the difference between (1) a later or earlier (time s) intensity value and (2) the average intensity value divided by the standard deviation of all of the intensity values.

The cross covariance is the normalized sum of the product of (1) the difference between (a) each intensity value for receiver A and (b) the average intensity value for receiver A and (2) the difference between (a) each intensity value recorded by receiver B and (b) a later (by time s) intensity value and the average intensity value for receiver B divided by the product of (1) the standard deviation of the intensity values for receiver A and (2) the standard deviation of the intensity values for receiver B, for all of the intensity measurements.

The Briggs Paper

A 1954 paper (B. H. Briggs and M. Spincer, Rept. Progr. Phys. 17, 245 (1954)) described then existing knowledge of horizontal movement of the atmosphere as obtained by radio methods. These radio waves included radio waves from stars and meteor trails and radio waves reflected from the sporadic-E region.

The R. S. Lawrence Paper

A 1972 paper, Lawrence R. C. et. al., "Use of Scintillation to Measure Average Wind Across a Light Beam" Applied Optics, Vol. 11, No. 2, 239-243, 1972, describes a sensor that uses the motion of turbulence-induced scintillation patterns at a receiver to measure the transverse component of the path-integrated wind along the line-of-sight (LOS). An interaction of the laser beam with turbulent eddies carried by the wind modulates the beam and produces a time varying scintillation pattern of light and bright spots moving between two horizontally separated optical receivers located at the other end of the propagation path.

The Wang Paper

Another example is Ting-I Wang et. al. "Wind Measurements by the temporal cross-correlation of the optical scintillations" Applied Optics, Vol. 20, No. 23, 4073-4081 (1981) discussed in detail five techniques of cross-correlation analysis for extracting path-integrated crosswind information using two horizontally separated receivers: (1) a peak technique, (2) a slope technique, (3) a frequency technique, (4) a Briggs technique and (5) a covariance technique.

These techniques are summarized below (for specifics see the papers):

FIG. 1A shows a typical normalized time-lagged auto-covariance and cross-covariance functions of the optical wind sensor described briefly in FIG. 1, where:

$\tau_p$=time delay at the peak of the cross-covariance curve;

$\tau_c$=crossover time delay on the auto-covariance and cross-covariance curves;

$\tau_f$=width of the auto-covariance curve at half-power point; and $S_0$=slope of the cross-covariance curve at zero time delay.

A. Peak Technique

The time delay at the peak of the covariance function is found by taking $\partial C_\chi / \partial_\tau = 0$, and we have $$\tau_p = \rho \bar{u}/(\bar{u}^2 + \sigma_v^2),$$

where $\sigma_v$ is the standard deviation of the wind fluctuations along the path and $\rho$ is the separation of the apertures. The wind velocity can be obtained from:

$$V_p \sim \frac{\rho}{\tau_p} = \bar{u} + \frac{\sigma_v^2}{\bar{u}}.$$

It is clear that measurement by the peak technique is heavily contaminated by wind fluctuations along the path.

B. Slope Technique

The slope at zero delay is $$S_0 \equiv \frac{\partial C_\chi}{\partial_\tau}\bigg|_{\tau=0} = -2\rho \bar{u} f'$$

where $f'$ denotes the first derivative of function $f$ at $\tau=0$, and the wind velocity is $$V_s \sim S_0 \sim \bar{v}.$$

Hence for the slope technique, the measured velocity is independent of the wind fluctuations.

C. Frequency Technique

The width of the auto-covariance function ($\rho=0$) at the half-power point is:

$$\tau_f(\bar{v}^2+\sigma_v^2)^{1/2}.$$

From the wind velocity is $$V_f \sim (1/\tau_f) \sim (\bar{v}^2+\sigma_v^2)^{1/2}.$$

This technique is contaminated by the wind fluctuations but not so badly as is the peak technique.

D. Briggs Technique

In 1950 B. H. Briggs and others (Proc. Phys. SOc. B 63,160 (1950) point out that the crossover time delay of the auto-covariance curves in inversely proportional to the pattern velocity drifting across the detectors and is independent of change in the pattern with time. The crosswind can be obtained by:

$$V_b=[\rho/2\tau_c]$$

The crossover time delay of the auto-covariance and cross-covariance curves can be obtained by setting $$(\rho-\bar{v}\tau_c)^2+\sigma_v^2\tau_c^2=(\bar{v}^2+\sigma_v^2)\tau_c^2$$

or $$\tau_c=\rho/(2\bar{v}).$$

The wind velocity obtained from Eq. (8) is $$V_B=[\rho/(2\tau_c)]=\bar{v}.$$

As with the slope technique, the wind velocity measured by this technique is independent of wind fluctuations.

E. Covariance Technique

The fifth technique described in the Wang paper was developed by the authors and is described in the Wang paper. They measure the covariance function at a number of delays (in an example 14 delays), each of time lag T. They vary T so that $$(C_a+C_b+C_c)-(C_d+C_e+C_f+C_g)+(C_h+C_i+C_j+C_k)-(C_l+C_m+C_n)=0$$

Where $C_i$ denotes the cross covariance at time delay i and they determine the wind velocity as $V_c \sim 1/T$.

Lockheed Martin Patent

U.S. Pat. No. 8,196,828, assigned to Lockheed Martin, proposes to measure a crosswind profile along the path between the shooter and the target by measuring statistics in the scintillation pattern created by an outgoing beam at the target using an imaging system with high frame rate camera at the shooter location. This sniper system comprises an illuminator that generates a collimated beam projected at a target, an imaging camera including a focal plan array, which detects backscatter radiation, and a controller connected to the illuminator and ranging device. A collimated laser beam illuminates a target and high speed imaging camera is used to image scintillation pattern created by the illumination beam on the target. By measuring a spatial-temporal covariance of intensity fluctuation of a laser return from the target and covariance slope (time derivative) of the non-excluded pixel pairs, a crosswind profile is reconstructed by inverting the matrix equation derived for one-way propagation geometry by Barakat et. al. "Remote Sensing of crosswind profiles using the correlation slope method," J. Opt. Soc. Am., vol. 69, No. 11; November, 1979. The controller calculates the range to a target, crosswind profile between the shooter and the target and the aim point offset (APO). This approach has five principal drawbacks:

1) diffraction on a receiving aperture at the shooter location blurs an image of the scintillation pattern created by illuminating beam at the target. In order to resolve changes in the scintillation pattern on the target a large receiving aperture (>80 mm) is required;
2) atmospheric turbulence on a return path from the target to the shooter introduces turbulence blur in the image of the scintillation pattern on the focal plane array. The effect of turbulence on a return path on scintillation statistics must be taken into account. The necessity to manually set a variable called the "scintillation kernel" in the wind profile reconstructor makes this system operationally unsuitable;
3) because a laser return signal spread between multiple pixels of the focal plane array, high laser power is required; and
4) a method for crosswind profile reconstruction developed by Barakat et. al. "Remote Sensing of crosswind profiles using the correlation slope method," J. Opt. Soc. Am., vol. 69, No. 11; November, 1979 (ref. 3) is based on weak scintillation theory, which is valid only when the scintillation index $\sigma_I^2=0.124\ k^{7/6}L^{11/6}C_n^2<1$, or refractive index structure characteristic $C_n^2$ at L=1 km for wavelength $\lambda$=1.55 μm (k=2π/λ) is $C_n^2<10^{-13}$. On clear sunny day, near the ground $C_n^2$ frequently exceeds $10^{-13}$, and a weak scintillation theory is breaking down. Consequently, this system cannot operate in clear sunny day at ranges ≥1 km,
5) the system requires a large lens necessitating a spotter scope separate from the rifle and a separate spotter separate from the sniper.

The Israel Atomic Energy Commission Patent

U.S. Pat. No. 6,247,259, with a priority date of Oct. 9, 1997, is assigned to the State of Israel Atomic Energy Commission. The technique described and claimed in this patent proposes a method and apparatus for fire control using a "single-ended" optical system, which comprises the steps of measuring the target range and path-integrated crosswind velocity along the intended projectile trajectory prior to firing the weapon. The method comprises the following steps:

1) illuminating a desired hard diffuse target with a laser beam,
2) receiving the beam reflected from the desired target;
3) determining the target range by measuring the double pass time of flight of the laser pulse between transmitter and target,
4) determining the path integrated crosswind velocity and direction along the trajectory by receiving said reflected laser beam in two separate positions and measuring the intensity fluctuations in the two separate positions,
5) determining the horizontal and vertical deflections of the projectile, and
6) adjusting the weapon sight to compensate for the projectile deflections.

The Israel patent describes a "single-ended" configuration, when a laser illuminator and receivers are located at the shooter's location, and the system is suitable for weapon mounted applications. The application for this patent was filed in October 1998 and issued in 2001. Applicants believe this is the closest prior art to the present invention. FIGS. 1 and 3 through 6 are copies of the drawings from this patent. These drawings are briefly described below in the section of this application entitled, "Brief Description of the Drawings". One of the embodiments described would determine the "average crosswind" along the path. However, the patent at Col. 7 lines 63 to Col. 8 line 19 also described a second embodiment using a multi-element detector to "resolve the intensity of the crosswind speed in the relevant section of the path".

Single Ended Systems

One challenge in a single-ended crosswind sensing system is that the illumination laser beam propagates through atmospheric turbulence twice: from the shooter position to the target and back from the target to the shooter. Consequently, the beam is modulated by turbulence twice, on forward and return propagation paths. The theoretical models discussed above (Briggs, Lawrence and Wang) are based on one-way propagation theory and do not take into account the effect of turbulence on a return path. To provide a theoretical basis for a single-ended crosswind sensing system, a two-way propagation theory is needed. The Israel patent described above is a single ended system. But that model after almost 20 years of effort is not accurate enough to assure a high probability of killing of an enemy at distances in the range of about one kilometer with a single shot in the presence of a typical crosswind. In addition an analytical equation derived in Wang relates the cross-covariance and crosswind velocity is nonlinear. For crosswind profile reconstruction, a simple linear equation is required.

Wind Determination from the Frequency of Scintillation

Akira Ishimaru in 1972 paper "Temporal Frequency Spectra of Multifrequency Waves in Turbulent Atmosphere," IEEE Transactions of Antennas and Propagation, Vol. AP-20, 10-19 (1972) developed general formulation for temporal frequency spectra of the turbulence-induced scintillation using weak scintillation theory and Taylor's frozen turbulence hypotheses and method for wind velocity determination. A. Ishimaru showed that the characteristic frequency of the scintillation, $f_0$, is related to the crosswind velocity v and characteristic spatial scale of scintillation, which is in weak scintillation regime equals to radius of the first Fresnel zone, $\sqrt{\lambda L}$, by equation $$f_0 = \frac{v}{\sqrt{2\pi\lambda L}}.$$

By using this equation, for given wavelength, range, and characteristic frequency $f_0$, Ishimaru estimated that the wind velocity was $f_0$=8.05 m/sec=18 mil/h.

Belenkii Prior Art Papers

Single Aperture Crosswind Technique

The crosswind measurements have been performed using a single receiving aperture. A 1994 paper, Belenkii M. S., "Effect of residual turbulent scintillation and a remote-sensing technique for simultaneous determination of turbulence and scattering parameters of the atmosphere," J. Opt. Soc. Am., A, Vol. 11, 1150-1158 (1994), describes a sensor, which includes a laser illuminating a diffuse target and a single receiving lens with diameter of D=125 mm and focal length of F=3 m. Two receivers with apertures of $d_0$=0.1 mm horizontally separated by a distance ρ=0.54 mm were located in the focal plane of the lens. The measurements were performed at the 90 m range. The path-weighted average crosswind velocity was determined using cross-covariance analysis and peak method. It was shown that the crosswind velocities from optical measurements were in a good agreement with the anemometer readings.

A 1996 paper, Belenkii M. S., Gimmestad G. G, and Roberts D. W., "Single-ended Laser wind sensor," Proc. SPIE, Vol. 2828, 489-494 (1996) describes a laser wind sensor that measures a path-weighted average crosswind velocity and direction by viewing a distance target illuminated with a laser beam through a single receiving lens and observing motion of the turbulence induced scintillation pattern on the target. The crosswind velocity and crosswind direction were determined via cross-correlation analysis of the signals from two detectors located in the focal plane of the lens. The prototype sensor was tested in a controlled, laboratory environment and outdoors at 130 m range. It was shown that optical sensor is more sensitive than mechanical anemometers. The crosswind sensor was able to record air motion within the range of +−0.25 m/sec.

Refractive Index Structure Characteristic $C_n^2$ Via Image Laser Spot Centroid Measurements A 2000 paper, Belenkii M. S. and et al., "Experimental validation of the differential image motion lidar concept", Optical Letters, Vol. 25, 518-520 (2000), describes a method for measuring a path-integrated values of refractive index structure characteristic $C_n^2$ by illuminating a diffuse target with a laser beam recording a laser return with two spatially separated receivers, which create two images of a laser spot reflected from the target in the focal plane of two receiving lenses. The centroid of each laser spot is measured versus time, and variance of the difference between centroids of two images, or variance of the differential image motion, $\sigma_d$, is calculated. The path-integrated refractive index structure characteristic $C_n^2$ is related to the variance of the differential image motion, $\sigma_d$, through the equation $$C_n^2 = \frac{\left(\frac{\sigma_d}{f}\right)^2 d^{1/3}}{11.6\left[1 - 0.694\left(\frac{d}{\mu}\right)^{1/3}\right]}$$

Here d is the aperture diameter of the receiving lens, f is the focal length, and μ is the separation between two receiving lenses.

This method was implemented in the crosswind sensor prototype. The receiver diameter was 35 mm and the horizontal separation between two apertures was 60 mm.

What is needed is a compact, weapon-mounted, single-ended sensor system, which measures a crosswind profile and direction and target range and calculates an aim point offset in real time.

SUMMARY OF THE INVENTION

Preferred embodiments of the present invention provide sniper rifles having crosswind measuring components comprising an optical transmitter, an optical receiver, a display device and a processor. The optical transmitter produces a collimated laser beam for illuminating a spot on the target. The optical receiver receives optical signals transmitted by the optical transmitter and scattered back from the target and converts the optical signals into time varing electrical signals. The processor processes the time varying electrical signals to determine a path weighted average crosswind. The processor is equipped with software that permits it to calculate the path-weighted average crosswind utilizing at least three different methods, Three methods of crosswind determination including 1) dual aperture receiver with variable beam divergence, or angular profile analysis of the laser spot, to generate multiple path-weighting functions; 2) single aperture receiver to measure an average frequency of signal fluctuations caused by scintillation; and 3) single aperture receiver to record both a field image of the laser spot at the target and a de-magnified image of an entrance pupil can be used independently, or can be implemented using an integrated hardware system and used simultaneously to provide multiple estimates of the crosswind magnitude and direction.

In preferred embodiments the optical receiver comprises first and second wind measurement channels separated in a horizontal direction by a predetermined distance to receive optical signals from light transmitted by the optical transmitter and scattered back from a target, and converts the optical signals to obtain time varying electrical signals. Each optical receiver includes an objective lens that collects light, which is scattered from a laser spot illuminated on a target, and a beam splitter, which splits received light beam into two beams: one beam forms a field image of the laser spot on a sensor, whereas a second beam, which passes through a collimated lens and forms a de-magnified image of an entrance pupil of the objective lens. The processor processes four time varying electrical signals from the first and second wind measurements channels to calculate the auto-covariance and cross-covariances and average frequencies of the four corresponding signals. Two signals from each channel correspond to the field image of the laser spot and de-magnified image of an entrance pupil of the objective lens to determine the time delays from which a path-weighted average crosswind is calculated, and calculate an average frequency of signal fluctuations caused by scintillation fades proportional to the crosswind. Five estimates of the crosswind magnitude are calculated from: 1) auto-covariance and cross-covariance of the two signals from first and second measurement channels that correspond to the field image of a laser spot; 2) two estimates of the crosswind magnitude are calculated using de-magnified images of an entrance pupil of the objective lens in the first and second channel (single aperture technique), and 3) two estimates of the crosswind magnitude are determined by calculating an average frequency of signal fluctuations caused by scintillation in the first and second channels. A crosswind direction is determined from the sign of the peak of the cross-covariance of the two signals from first and second measurement channels.

Using five estimates of the crosswind magnitude obtained from different measurements, a weighted average of the path-weighted crosswind magnitude may be calculated using:

$$V_a = \sum_{i=1}^{5} \frac{1}{\omega_i} v_i \quad (1)$$

which has a path-weighted function that closely matches a predetermined Ballistic Influence Function based on ranges to the target. In Eq. (14) $v_i$ is the crosswind magnitude estimated using one measurement technique and $\omega_i$ is a relative weight of this estimate in the weighted average $V_a$. The optimal weights $\omega_i$ for crosswind magnitudes $v_i$ may be determined by combining individual path-weighting functions for five measurement techniques to closely match the predetermined Ballistic Influence Function.

Auto-Covariance and Cross-Covariance

Utilizing the auto-covariance and cross-covariance method the path-integrated crosswind is determined by processing the time series of two signals received by spatially-separated receive apertures and recorded by a high-speed short wave infrared camera in a series of multiple frames. The two time series of signals are correlated to estimate an auto-covariance and cross-covariance. The delay time associated with the crossing point between the auto-covariance and cross-covariance is then used to calculate a path-integrated crosswind and the offset aim point (OAP). Divergence of the illuminating laser beam is controlled to permit the system to calculate a path-weighted average crosswind correction to the aim point.

Applicants' device and method includes the features claimed in the Israel patent filed in 1998 but also includes Applicants new theory and software features as well as firmware that so as to provide a sniper rifle that does it job with about 78 percent success with one shot at distances of about 934 meters and a 65 percent probability at 1326 meters. In addition to the features outlined above, Applicant has simplified a 60-plus year old extremely complicated equation in a manner that permits solving it to calculate a path-integrated crosswind and confidence circle with an update rate of 50 msec.

A preferred embodiment of the present invention is a small arms fire control system including integrated cross wind measurement and ballistic calculator. In preferred embodiments the entire unit is battery operated and can be mounted directly on a rifle or spotter scope. The external sensors: magnetic compass, temperature, pressure, humidity sensors, and GPS receiver provide measurements needed for accurate ballistic predictions. The temperature, pressure and humidity are used to calculate the air density, relevant to determine the drag on the bullet. The magnetic compass and GPS receiver provide the direction of fire and latitude, both necessary to determine the Coriolis drift for a long range ballistic trajectory.

This preferred embodiment is designed to perform several functions: i) measure the target range, ii) measure crosswind and atmospheric parameters, iii) calculate bullet horizontal and vertical defection using ballistic calculator, and iv) image both laser beam and target for aiming. This system can be used as a clip-on attachment to the direct-view rifle scopes.

A dual mode laser is used to measure the range in pulsed mode and cross wind in the continuous wave (CW) mode. Range is measured based on the usual time of flight from the laser pulse out of the transmitter to one of the receiver detector (in this embodiment, the photo-diode connected to the left receive aperture). The laser is transmitted through a collimator (25 mm diameter) to provide a small spot on the target at long range. The beam divergence is in the range from 100 μrad to 300 μrad. In cross wind measurement mode, the laser transmits in CW mode, the backscattered light collected by two horizontally separated apertures and focused on a detector (focal plane array) capable of detecting the instantaneous intensity and position of the laser spot from each aperture independently. In preferred embodiments the aperture diameter is 35 mm, focal length is 100 mm and the center to center separation is 60 mm. The angular pixel size (IFOV) is 40 µrad. And total number of pixels is 640×480.

The spot image is focused onto the left and right halves of the focal plane array, separated by a baffle to prevent cross talk between the two apertures. The crosswind was calculated using auto-covariance and cross-covariance of two time varying signals recorded by two channels. The system microprocessor determines location of two image spots on the focal plane array and sum up the signal from all the pixels within a 20×20 pixels window, or measures total fluxes received by two apertures as a function of time. A field programmable gate array (FPGA) provides real time image processing of two time-series signals to estimate the auto-covariance and the cross-covariance as the time averages of the laser returns. One particular embodiment uses the peak method. In this approach, the time lag of the peak of the cross-covariance function is measured, or time required for the crosswind to move the turbulence eddies from the optical axis for the upwind aperture to the optical axis of the downwind aperture. The crosswind direction is determined by the sign of the peak of the cross-covariance. The path-integrated cross-wind velocity is determined by the ratio of the effective center to-center separation between two apertures to the peak time lag.

Another approach for cross-covariance analysis is based on determination of the crossing point between auto- and cross-covariance functions (Briggs method). In this method, the crosswind velocity is determined by the ratio of the center to-center separation between two apertures to the crossing point time multiplied by 2. This approach has an advantage, as compared with the peak method, that is less sensitive to the wind velocity fluctuations. This approach provides more accurate wind measurements, when the wind direction is predominantly close to parallel to the laser beam.

The sensor measurements including the cross wind and target range combined with the bullet characteristics (mass, ballistic coefficient, length, caliber) input by the user through the pushbuttons are used in the internal ballistic calculator to provide the horizontal and vertical offsets from the line of sight for the bullet deflection. The results are displayed to the user along with other information on the display. The microprocessor does all calculations, controls the laser and camera, and reads all sensors.

Single Aperture Technique

Since this first preferred embodiment provides two apertures, two separate estimates of the crosswind magnitude can be calculated using de-magnified images of an entrance pupil of the objective lens in the first and second channel.

Frequency Technique

Also, since this first preferred embodiment provides two apertures, two estimates of the crosswind magnitude are determined by calculating an average frequency of signal fluctuations caused by scintillation in the first and second channels.

Specific Preferred Embodiments

Specific preferred embodiments include portable integrated system encased in a housing comprising: an optical transmitter; an optical receiver; a display device; and a processor: wherein: the optical transmitter produces a collimated laser beam to illuminate a spot on the target, the optical receiver comprises first and second wind measurement channels separated in a horizontal direction by a predetermined distance to receive optical signals from light transmitted by the optical transmitter and scattered back from a target, and convert the optical signals to obtain time varying electrical signals; the processor processes the time varying electrical signals from the first and second wind measurement channels to determine a time delay from which a crosswind profile or a path-weighted average crosswind toward the target is calculated; the processor calculates, based on the path-weighted average crosswind and range, an aim point offset; and the offset aim point and a confidence metric is displayed on the display device.

Some embodiments also include a user interface allowing input of relevant ammunition and weapon data affecting a projectile hit point; and a plurality of sensors configured to measure environmental and ballistic parameters affecting a projectile hit point, wherein a ballistic calculator is used to calculate said aim point offset based on said measured environmental and ballistic parameters or said inputted data in addition to said path-weighted average wind and said range.

In other embodiments the measured parameters used by the ballistic calculator to determine the aim point offset comprises one or more of the following: temperature, pressure, humidity, tracking lead angle, rifle cant, GPS coordinates, compass heading and rifle pitch. And in some embodiments the system is mounted on one of: a rifle, gun and tripod. And in some embodiments the optical transmitter produces a collimated laser beam that is bore-sighted to a rifle barrel, gun barrel, or scope crosshair. Other embodiments include a range measurement channel and an image-capturing channel including a digital camera configured to create an image in the visible or infrared spectrum. The system may display an image captured by the image-capturing channel in order to simulate a scope-view of the target and surrounding area. The optical receiver of embodiments will typically include optics to collect light from the laser beam, which is reflected from the target, onto the first and second wind measurement channels, each of the first and second wind measurement channels including an image sensor, or an APD (avalanche photo diode), or a PIN photodiode. Preferred embodiments will typically include a detector which measures a round trip time of flight between the optical transmitter and the target by narrow pulses of light, wherein a range to the target is calculated by the processor based on the measured round trip time. Embodiments may include a digital camera which images the target and a surrounding area for display to a user based on daylight or laser illumination in the visible or infrared range. The display device may be a synthetic eyepiece, which mimics a direct view optics eyepiece, and displays an image of the target and the surrounding area imaged according to the laser illumination or daylight.

In other preferred embodiments the processor also calculates, based on the path-weighted average crosswind, a confidence circle and the confidence circle is displayed on the display device. In preferred embodiments the optical transmitter includes a fiber laser and at least one collimating lens positioned at a distance from the exit aperture of the fiber laser. The collimated laser beam can be made slightly divergent within a range of 25 micro-radians to 300 micro-radians. The transmitter can include divergence changing optical components to produce a plurality of divergent laser beam so as to produce a plurality of different spot sizes on the target. A preferred technique is to provide a plurality of optical lenses are mounted on a wheel. Another technique for changing the divergence is to change the distance between the exit aperture of the fiber laser and the at least one optical lens. This can be done with a motorizes stage adapted to move the fiber laser or to move the lens.

Derived Patents and Patent Application

The Varshneya Patents

At this place in their description of their invention Applicants need to provide a short history and statement of facts related to three patent applications (which have now issued a patents) that have been derived from Applicants' concepts and research and developments:

DARPA Broad Agency Announcement

In the early fall of 2011, Applicants became aware of a potential interest by U.S. Defense Advanced Research Projects Agency (DARPA) and US Special Operations Command (SOCOM) in seeking research proposals for research and development of crosswind correction of sniper rifle aim point. On Nov. 22, 2011 DARPA issued a Broad Agency Announcement (BAA) advertising that it was initiating a new program (One Shot XG) to develop a compact observation, measurement and ballistic calculation system that could be mounted on a weapon to enable snipers to hit a target with the first round under crosswind conditions at the maximum effective range of the weapon. The DARPA Program Manager was Dr. Deepak Varshneya. Proposers were instructed that, "It is the Proposer's responsibility to clearly define to the Government what is considered proprietary data." But the instructions also provided that "DARPA permission must be received before publishing any information or results relative to the program." The BAA also provided," It is the policy of DARPA to treat all proposals as competitive information and to disclose their contents only for the purpose of evaluation."

Trex's Internal Development Effort

Trex's scientists, in particular Applicant Dr. Mikhail Belenkii, had substantial experience in crosswind correction using scintillation measurements of closely spaced light beams. During the period between 1994 and December 2011, Dr Belenkii had conducted numerous crosswind development efforts and experiments and had published 3 papers on the subject. Beginning in September 2011 Trex conducted a self-funded $250,000 IR&D-B&P development to produce a prototype crosswind sensor in order to be prepared to respond to expected requests for proposals for a government supported research and development effort from DARPA and SOCOM. The results of the theoretical analysis Trex effort was summarized in December 2011 in an Internal Memo. These results were:
  delivered to Cubic Defense Applications (Cubic) and included in Section 3.31 of a formal One Shot XG proposal submitted by Cubic to DARPA on Jan. 31, 2012;
  delivered to Cubic in the SOCOM proposal "Long Range Sniper Ballistic Solutions Systems Program" on Jan. 17, 2012;
  delivered to DARPA in the white paper "Path Weighting Function for Pupil Plane Measurements for Airborne One Shot" submitted to DARPA on Apr. 23, 2012; and
  presented in Trex's proposal "Downrange Crosswind Sensor for Small Arms Fire Control" submitted to US Army SBIR office on Jun. 22, 2012.

All of the above deliveries were made prior to the execution of Cubic's prime contract with DARPA and prior to the execution of Trex's subcontract with Cubic. All of these pre-contract results were marked "Proprietary" by Trex, and Cubic marked its proposal to DARPA, including the Trex Section 3.31, "Proprietary".

DARPA Contract

Cubic executed Prime Contract No. HR0011-12-C-0088 with the US Government for DARPA's One Shot XG Program and soon thereafter, effective 2 Aug. 2012 Trex and Cubic signed a corresponding subcontract in support of the prime contract. DARPA funding for the work by Trex was in excess of $1.600,000. Work under the contract was completed in the summer of 2015 and Trex's One Shot XG Final Report was delivered to Cubic on Jun. 19, 2015 and Cubic's Final Report was dated 2 Jul. 2015. Both Cubic and Trex gave the Government only "limited rights" in certain specified background data and software.

Contract Results

The primary objectives of the Trex subcontracted effort were to:
  (i) develop a crosswind sensing algorithm and ballistic calculator;
  (ii) implement the sensing and ballistic calculator in a custom FPGA processor and
  (iii) deliver the FPGA-processors to CUBIC to support open-box and closed-box prototype performance evaluation of OXSG during multiple field-tests.

Specifically, the crosswind sensing algorithm directly computes the crosswind velocity and direction using measures of turbulence-induced scintillation acquired by active laser interrogation of a diffuse target from ranges up to 1.5 km from the shooter position. These crosswind velocities and direction are input into the developed ballistic calculator to determine the aim-point offset and confidence circle. The algorithm and ballistic calculator were performance-evaluated against DARPA "Go-no-Go" performance metrics under multiple field-tests. Finally, the proven crosswind algorithm and ballistic calculator were implemented in custom FPGA-processing boards for final integration into twelve close box One Shot prototype units.

During its self-funded development program during 2011 and prior to the execution of the One Shot Contract in 2012, Trex developed the analytical model for the crosswind sensing algorithm which uses measurements of turbulence-induced scintillation from a laser beam reflected by a diffuse surface. This analytical model predicts a unique path-weighting function, which is a function of four parameters: range, beam divergence, wavelength, and receive aperture diameter. This path weighting function distinguishes Trex's crosswind technology from all crosswind prior art and is the central element of Trex's crosswind invention.

In the course of the One Shot program, as explained above, Trex developed the details of Dr. Belenkii's crosswind algorithm with its path weighting function and programmed a FPGA controlling a high frame rate SWIR camera in order collect and record nine seconds of the two return signals and to calculate a path-integrated crosswind and confidence circle with an update rate of 50 milliseconds. The 8,100 values of cross-correlation are also arranged as a function of time.

The two time series of signals are thus correlated to estimate an auto-covariance and cross-covariance. The auto-covariance is normalized on the variation of the intensity of the return signals recorded by both receivers. The cross covariance is also normalized on the variance of the intensity fluctuations of the two receivers. The crossing point between the auto-covariance and cross-covariance is then used to calculate a path-integrated crosswind and the aim point offset (APO). The crosswind algorithm was first implemented in MATLAB and extensively tested using a brassboard demonstrator and an open-box integrated measurement system (IMS). The qualified algorithm was then implemented in real-time C-based software and FPGA firmware. Key steps in the crosswind algorithm calculation were delivered to DARPA (Mr. David Busigo and Mr. Larry Jeffers) on Jun. 18, 2015. All source code for Trex's crosswind algorithm was delivered to DARPA in October, 2014.

Applicants developed a custom miniature FPGA board for the final implementation of the form-factor-compliant integrated processor which included a Xilinx FPGA, ARM processors, and SDRAM memory. Trex and Cubic preformed a large number of tests of crosswind equipment and a final test on Dec. 16 to 18, 2014.

One of the purpose of preparing this patent application was to permit Applicants to institute a derivation proceeding challenging the Varshneya patents and patent application. As Applicant's understand the derivation proceedings rules, an applicant is encouraged to copy as much of the derived patent or application as he reasonably can. Applicants believe that many of Varshneva's claims are invalid as being clearly disclosed in the prior art or are obvious based on prior art including, especially U.S. Pat. No. 6,247,259 discussed in the Background section. Nevertheless, Applicants have copied the broadest chaim in each of the Varshneva patents. For example the first claim in this application makes the same claim as the first claim in Varshneya U.S. Pat. No. 9,127,911 as follows:

A portable integrated system encased in a housing comprising: an optical transmitter; an optical receiver; a display device; and a processor, wherein: the optical transmitter produces a very slightly diverging (100 μrad-300 μrad) laser beam to illuminate a spot on the target, the optical receiver comprises first and second wind measurement channels separated in a horizontal direction by a predetermined distance to receive optical signals from light transmitted by the optical transmitter and scattered back from a target, and convert the optical signals to obtain time varying electrical signals, the processor processes the time varying electrical signals from the first and second wind measurement channels to determine a time delay from which a path-weighted average crosswind toward the target is calculated, the processor calculates, based on the path-weighted average crosswind and range, an offset aim point, and the offset aim point is displayed on the display device.

Dr. Varshneya's Derived Patent Applications and Patents

Dr. Deepak Varshneya (the DARPA project manager of DARPA's One Shot XG Program) and two other DARPA personnel who have filed three patent applications (which have issued as patents) describing and claiming an invention made by Applicants. The patents and patent application filed include claims to technical data and software created by Applicants prior to Trex's work on the One Shot Program as well as improvements conceived and reduced to practice by Trex employees in the course of Trex's work on the One Shot Program. The prime contractor for the One Shot Program was Cubic Defense Applications, Inc. and Trex Enterprises Corporation was Cubic's major subcontractor.

Applicants suspect that Dr. Varshnneya did not comply with his obligations under 37 CFR 1.056, "Duty to disclose information material to patentability". This regulation requires applicants to "disclose to the Office all information known [to the Applicant] to be material to patentability". For example, Dr. Varshneya may have not disclosed U.S. Pat. No. 6,247,259 filed Oct. 8, 1998 and issued Jun. 19, 2001 to the State of Israel. Applicants believe this patent may disclose all of the features claimed in the broadest claim of each of the two patents and the patent application. Dr. Varshneya also apparently did not disclose to the Patent Office, Cubic's proposal, dated 31 Jan. 2012 for the One Shot Program which was addressed specifically to the attention of Dr. Varshnneya at DARPA. The Cubic proposal in Section 3.31 entitled "Crosswind Profiling Concept" included a detailed description of Trex's modified path-weighting function and also described a Field Demonstration of Trex's crosswind profiling concept. Much of the features of Trex's concept were included in each of the three patent applications filed in 2013, 2014 and 2015. Dr. Varshneya also apparently did not disclose to the Patent Office the contents of a Trex Internal Memo dated December 2011 which was referenced (Ref.5), but not included, in the Cubic proposal. However, the equations for path weighting function derived in the Internal Memo was later delivered to Dr. Varshneya on Apr. 24, 2012 at his request in the form of a white paper, entitled "Path Weighting Function for Pupil Plane Measurements for Airborne One Shot. This white paper was marked with a Trex proprietary statement that data included "shall not be disclosed outside the Government". In two Apr. 26, 2012 e-mails respectively to Larry Jeffers and Dr. Varshneya, Dr. Belenkii transmitted a document entitled "Integral Equation for Crosswind Profile Reconstruction". The document includes, in addition to the equation, graphs for 10000 meters and 15000 meters each with divergences of 50 μrad, 100 μrad, 250 μrad and 500 μrad. Equivalent graphs appear in all three of Dr. Varshneya's patents as FIG. 15 except the range is not specifically shown on the graphs and the divergences are shown as 50 μr, 100 μr, 200 μr and 300 μr. The equation itself appear to have been copied substantially verbatim from Dr. Belenkii's white paper in Dr. Varshneya's '653 patent application in Paragraph [0194] and Col 41 of his corresponding U.S. Pat. No. 9,347,742. This solution by Trex employee, Dr. Mikhail Belenkii, converts a famous non-linear equation proposed in a 1981 paper into a much simpler linear equation permitting crosswind speeds to be calculated with an FPGA continuously every 50 milliseconds. The equation is a critical feature of Trex's crosswind invention. Dr. Varshneva included all of the important features of Trex's invention in each of his three patent applications in order to be able to claim a system or method to calculate a "path-weighted average crosswind". The Cubic proposal and the white paper were proprietary documents and the information contained in them should not have been disclosed in the form of the Varshneya patent applications (which have been made public). These Trex documents were "material to the patentability" of Dr. Varshneya's patent applications, so they should have been disclosed to the patent office under 37 CFR 1.56. The fact that information is proprietary should not excuse an applicant for a patent from disclosing it to the USPTO if the information is material to patentability. USPTO has regulations allowing applicants to disclose proprietary documents to the USPTO. (See MPEP Section 724.02, "Method of Submitting Trade Secrets, Proprietary and/or Protective Order Materials".)

Trex has believed it important to keep the certain details of DARPA's One Shot XG sniper technology developed by Trex secret, because the disclosure of this information could permit enemies of the United States to assassinate victims at distances of almost a kilometer with one shot with about 78 percent probability of success. Applicants in this application have requested the USPTO to withdraw the Varshnneya patents and to examine Applicants' patent application under the secrecy rules of the USPTO. The US Government will have rights under any resulting patent since Applicants' invention was reduced to practice under Trex's DARPA supported research.

Additional Specific Details

Dr. Varshneya Patent Applications and Patents

Dr. Deepak Varshnneya along with Steve Griggs and Larry Jeffers (DARPA employees) have filed three patent applications incorporating concepts, techniques and other data derived from the work of Trex employees. All of them have issued as patents. They are;

Electro-Optic System for Crosswind Measurement, Ser. No. 14/140,163 filed Dec. 24, 2013 now U.S. Pat. No. 9,127,911, Electro-Optic System for Crosswind Measurement, Ser. No. 14/450,076 filed Aug. 1, 2014 now U.S. Pat. No. 9,157,701.

Electro-Optic System for Crosswind Measurement, Ser. No. 14/661,653 filed Mar. 18, 2015 now U.S. Pat. No. 9,347,742.

The first of these patent applications was filed while Dr. Varshneya was employed at DARPA and the last two patent applications were filed while he was a consultant to Trex. The Consulting Agreement requires him to assign to Trex inventions made in connect with his work for Trex that relate to Trex business. On his list of patents attached as Attachment A to his Consulting Agreement he added a statement: "Crosswind Measurement Application filed on 24 Dec. 2013". And he added the following statement in the body of his consulting agreement: "Trex recognizes the consultant is actively engaged in developing commercial hunting products for compensating crosswinds under Xero Wind LLC and has filed a set of patents to cover this IP (attachment A)". His patent applications and patent are not at all limited to hunting products.

Specific Concepts Claimed by Dr. Varshneya but Derived from Trex Work

The following are some of the Trex's concepts Dr. Varshneya has included in his patent application:

Claim 1 of the '911 patent and the '701 patent: The claims are limited by the phrase "calculate a path-weighted average crosswind and an off-set aim point based on the average frequency of the signal fluctuations caused by scintillation fades proportional to the crosswind, the range and the refractive index structure parameter."

This path-weighted average crosswind is the central most important feature of Dr. Belenkii's invention and is not available in the prior art. Dr. Belenkii derived a relatively simple linear algorithm from a very complicated non-linear algorithm that has been in the public domain for more than 60 years. It is this linear algorithm that permits a high-speed FPGA to calculate the crosswind speed based on the scintillation caused signal fluctuation form two approximately parallel beams of light with an update rate of 50 milliiseconds.

Claim No. 21 of the '911 patent: "The system of claim 20, wherein the processor determines the path-weighted average crosswind according to multiple weighting functions which are generated by changing the divergence of the laser beam transmitted by the optical transmitter."

This claim includes Trex's IP. A method of measuring a crosswind at different range bins along the line-of-sight using variable beam divergence is NOT available in open literature. This method was developed at Trex under internal funding. Trex's Phase I SBIR proposal for topic A 12-103 "Downrange Crosswind Sensor for Small Arms Fire Control" submitted to US Army SBIR Office on Jun. 26, 2012 (two months prior Trex's subcontract under DARPA One Shot XG program was awarded on Sep. 10, 2012). (Trex's SBIR proposal is attached.) This novel method of crosswind sensing using variable beam divergence was disclosed to DARPA team and Dr. Varshneya in the brief on Oct. 18, 2012.

Claims No. 20 and No. 21 and FIG. 15 of the "911 patent: The claims claim path-weighting functions for different beam divergences also include Trex's IP. FIG. 15 and claims No. 20 and 21 require that analytical solution for the non-linear equation (Eq. (3) in the paper by Ting-I Wang, G. R. Ochs, and R. S. Lawrence, "Wind measurements by the temporal cross-correlation of the optical scintillation," Applied Optics, Vol. 20, 4073-4081 (1981).), which relates the cross-covariance of intensity fluctuations and crosswind profile be known. This analytical solution is NOT available in the open literature.

The analytical solution for the non-linear equation (3) of the Wang paper, which relates the cross-covariance of intensity fluctuations and crosswind profile, was developed at Trex under internal funding. This solution was included in Trex's SBIR proposal for topic A 12-103 submitted to US Army SBIR Office on Jun. 26, 2012 and One Shot XG proposal submitted by Cubic (prime) to DARPA in response to DARPA-BAA-12-10 (Section 3.3.1 Crosswind Profiling Concept and FIG. 3.3.1-1, which presents path-weighting functions for focal plane and pupil plane measurements for beam divergence 100 μrad and 200 μrad). In Trex's submission to Cubic, Trex marked this contribution to the proposal as "Trex proprietary".

FIG. 12 of '911 patent: This is a flowchart illustrating an algorithm for obtaining a single measurement of a path-weighted averaged crosswind.

a. A procedure for background subtraction from each of m frames pixel by pixel (3306) by collecting the background frame for each channel by averaging n frame pixel by pixel (3303) was proposed, implemented in the software and tested under One Shot XG program by Trex.

b. Trex proposed to sum up all laser illuminated pixels to determine total flux of a laser return in both channels (3307 and 3308). Two spaced APDs were used by Trex in Field Demonstration of the Crosswind Profiling Concept: FIG. 3.3.1-1 included in DARPA One Shot XG proposal;

c. Approach for crosswind estimation (block 3314—determine time $t_p$ at peak of cross covariance curve.

Peak Method) was proposed and field demonstrated by Trex as part of DARPA One Shot XG pre-proposal effort d. Another approach for crosswind estimation (block 3313—determine time of the crossover $t_c$ between cross and auto covariance curves (Briggs Method) was proposed by Trex to reduce an effect of the wind fluctuations on crosswind measurements under DARPA One Shor XG program.

Claim 3 the '701 patent—"The system produces a dual divergence laser beam . . . "

This claim includes Trex's IP related to novel method for crosswind sensing using variable beam divergence and analytical solution for non-linear equation for cross-covariance function of intensity fluctuations (see bullets 2 and 3).

Claim 8 of the 701 patent: This claim claims a system for measurement of the refractive structure characteristic of the atmosphere by detecting a centroid of the time-varying laser spot over multiple franmes.

This concept was developed by Trex, when Trex's team worked on One Shot XG DARPA program based on the prior work of Trex's Dr. Belenkii (M. Belenkii, et, al., Experimental validation of the differential image motion lidar concept," Optics Letters, Vol. 25, 518-520 (2000).

Claim 10 of the 701 patent: This claim includes the calculation of a confidence metric based on a variance of repeated measurements. This solution was proposed, implemented in the software and field demonstrated by Trex under One Shot XG program.

FIGS. 12 of patent '701: This is a flowchart illustrating an algorithm.

This includes Trex's IP

FIG. 15 of the 701 patent: This Claim includes Path weighting function

This is Trex's IP.

Claims 7 and 8 the '653 patent application: These claims claim a system wherein a processor performs a calculation of a path-weighted average crosswind based on Dr. Belenkii equations delivered to Dr. Varshnneya on Apr. 26, 2012 in the form of a white paper marked proprietary by Trex. The equations from the white paper appear to have been copied and appear Col 41 of Varshneya U.S. Pat. No. 9,347,742 and path weighting function curves apparently derived from Dr. Belenkii's algorithm appear in FIG. 15 of all three of Dr. Varshneya's crosswind patent applications.

GOVERNMENT RIGHTS

Trex's research contracts with the US Government require Trex to grant a government purpose license to any patent conceived or first actually reduced to practice in the course of performance of a government contract. Trex is required to include a notice to this effect at the beginning of the specification. This application includes the required notice on page 1 of this specification. There does not appear to be any such notification in Dr. Varshnneya's patents.

DARPA Policy re Employee Inventions

Trex employee Dr. Jinendra Ranka made an inquiry at DARPA as to whether DARPA had authorized Dr. Varshneya to file patents regarding the One Shot XG program and Dr. Ranka received the response from DARPA Associate General Counsel Terry Stenerson as shown in the copy of an e-mail shown in FIG. 23.

Failure to Cite Relevant Prior Art

The closest public domain prior art to the patents and application of Dr. Varshnneya is U.S. Pat. No. 6,247,259 µranted to the State of Israel Atomic Energy Commission. This patent should have been disclosed by Dr. Varshneya to the USPTO. Dr. Varshneya was also obligated to disclose to the USPTO pre-contract documents that are material to patentability of the claims in the Varshneya patents. These documents were delivered to DARPA by Cubic and Trex prior to the execution of the One Shot contract including the Cubic One Shot proposal. These documents include Trex's detailed description of its prototype crosswind sensor and Trex's theoretical analysis described above. In addition all of the conceptual work by Trex employees described in this specification and delivered to DARPA should have been disclosed to the USPTO as prior art since the two Trex inventors were not included as named co-inventors.

Derivation Proceedings

The US patent and Trademark Office has available to Trex a derivation proceeding. The rules of the derivation proceeding provide that the inventor must file an application. He may copy an alleged deriver's application, make any necessary changes to reflect accurately what the inventor invented and provoke a derivation proceeding by filing a petition and fee. Applicants' employer, Trex Enterprises Corporation, has decided that cannot justify the expense of a derivation proceeding estimated by the USPTO to be $61,333 just to prepare the petition with a total cost to each party of about $460,000. (See Oliff & Berridge, PLC—Special Report dated Oct. 19, 2012.) However, Applicants suggest that the USPTO can and should on its own withdraw the three Varshneya patents under one or more of the first three reasons listed in the next section. All three reasons are supported by information provided in this application. Which claim substantially the same inventions as claimed in the three Varshneya patents. Applicants also suggest that these three patents and the corresponding applications should not be considered prior art in the examination of the claims of this application. Under the derivation proceeding rules a petitioner is encouraged to copy claims of the derived patent application. Although Trex is not proceeding with a derivation proceeding, Applicants have copied the first claim from each of the three patents. Applicants believe they could have justified copying virtually all of them but Applicants did not want to incur the expense of copying all 55 claims of the three patents. Claim 1 of this application corresponds to Claims 1 of Varshneya patent '119, Claim 2 of this application corresponds to Claim 1 of Varshneya patent '701 and Claim 3 of this application corresponds to Claim 1 of Varshneya patent '742. Claims 4 through 15 of this application are new.

Withdrawal of a Patent by the Patent Office

The Patent Office may withdraw an issued patent only for the following reasons:

1) A mistake on the part of the Patent Office;
2) A violation of Section 1.56 (of the MPEP) or illegality in the application;
3) Unpatentability of one or more claims; or
4) For interference or derivation proceeding.
(MPEP 1.56 is the duty to disclose relevant prior art.)

Applicants Recommend Withdrawal of the Varshneya Patents

Applicants recommend that the USPTO withdraw the three Varshneya patents for one or all of reasons 1), 2) or 3) listed above based on the information provided in this patent application, especially the prior art described above and documents delivered by Trex and Cubic to DARPA prior to and during the course of DARPA's One Shot XG Program. Applicants will mail a copy of this patent application to Dr. Varshneya's attorney and will request confidential treatment of it. Applicants plan to suggest that Dr. Varshneya may want to consider amending the three patents to name Applicants, Dr. Belenkii and Dr. Brinkley, as co-inventors and to include a reference in each of the patents confirming that the invention was made with government support and that the federal government has rights in the invention.

Information Disclosure Statement

Applicants plan to submit an Information Disclosure Statement in this proceeding that will include relevant prior art documents discussed in this specification and will include documents prepared by Trex employees and delivered to DARPA prior to the filing of one or more of the Varshneya patent application. Hopefully, the USPTO will consider these documents in deciding whether to withdraw the Varshneya patents.

BRIEF DESCRIPTION OF THE DRAWINGS

A brief description of these drawings is as follows.

FIG. 2 is a copy of FIG. 2 of prior art U.S. Pat. No. 6,247,259 showing a schematic illustration of an apparatus according to an embodiment of the '259 invention.

FIG. 3 is a copy of FIG. 3 of prior art U.S. Pat. No. 6,247,259 showing a schematic illustration multi-element receiver according to an embodiment of the '259 invention.

FIGS. 8A and 8B are copies of greyscale images illustrating the difference between an image of a transmitted coherent laser beam and an image of the same coherent laser beam reflected from a target.

FIG. 9 is computer created graph comparing cross-covariance and auto-covariance curves utilizing one-way propagation with cross-covariance and auto-covariance curves utilizing two-way propagation, when the received beam is a beam reflected from a target.

FIG. 10A is a comparison of measured normalized auto-covariance and cross-covariance curves for crosswind measurement for one-way laser transmission (continuous curves, LED) and two-way reflected laser transmission (dotted curves, laser) showing that results are the same for peak location of the cross-covariance and location of the crossing point between auto-covariance and cross-covariance.

FIG. 10B a comparison of normalized auto-covariance—cross-covariance curves for crosswind measurement with one-way laser transmission (continuous curves, LED) and two-way reflected laser transmission (dotted curves, laser) showing that results are the same for peak location of the cross-covariance and location of the crossing point between auto-covariance and cross-covariance.

FIG. 18 is a copy of a photograph of an upgraded brass board version built by Applicants in 2012.

FIGS. 19A, 19B are graphs showing test results of a frequency based technique for measuring crosswind speeds where the wind speed is 4 m/s and there is weak scintillation, FIG. 19A is PSF vs frequency and 19B is PSF times frequency.

FIG. 20A is PSF vs frequency and 20B is PSF times frequency.

FIG. 23 is a reproduction of an e-mail from a DARPA Associate General Counsel concerning patents filed by Dr. Varshneya.

DETAILED DESCRIPTION OF PREFERRED EMBODIMENTS

A Fire Control System

Figure 17:
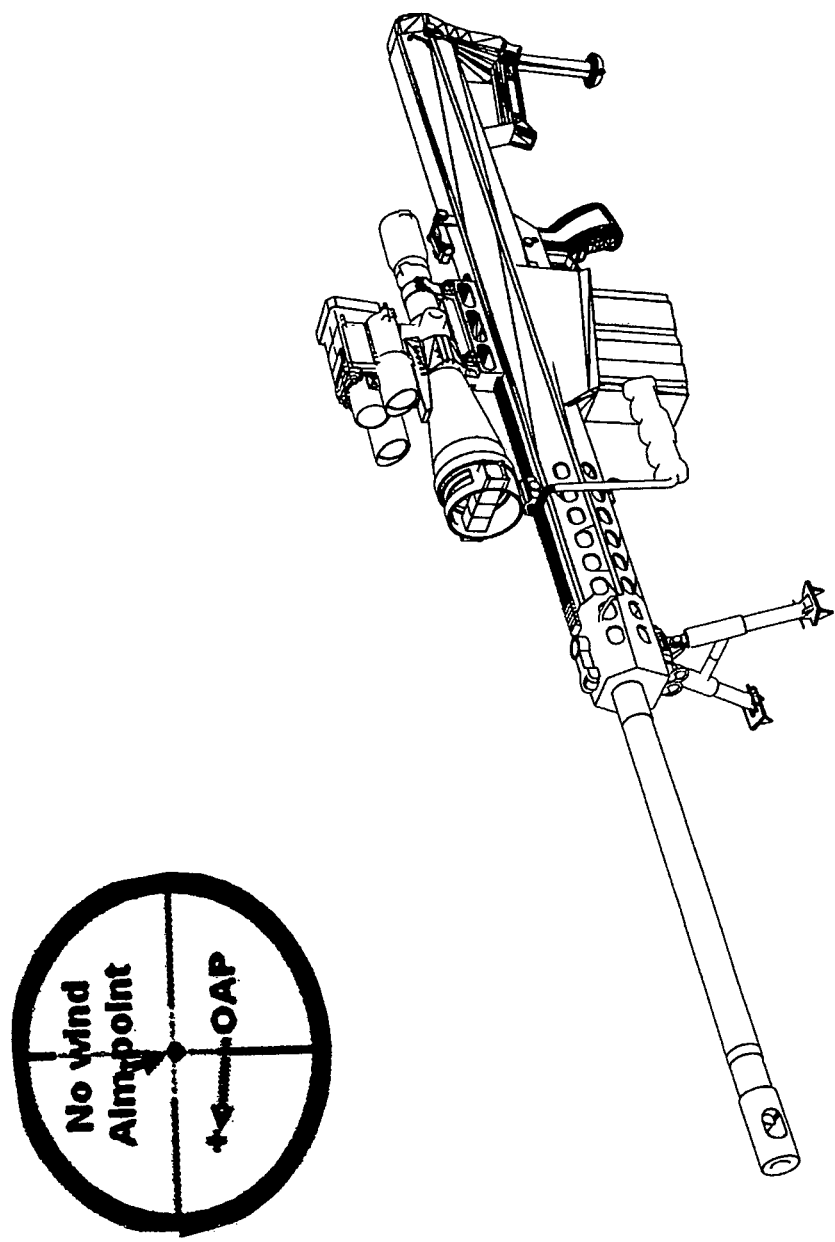
FIG. 17 is a greyscale copy of a photograph of the prototype system mounted Remington 783 bolt action rifle built by Trex and Cubic under the DARPA contract and used in the final test at a shooting range at Ocotillo Wells, Calif.
Figure 17A:
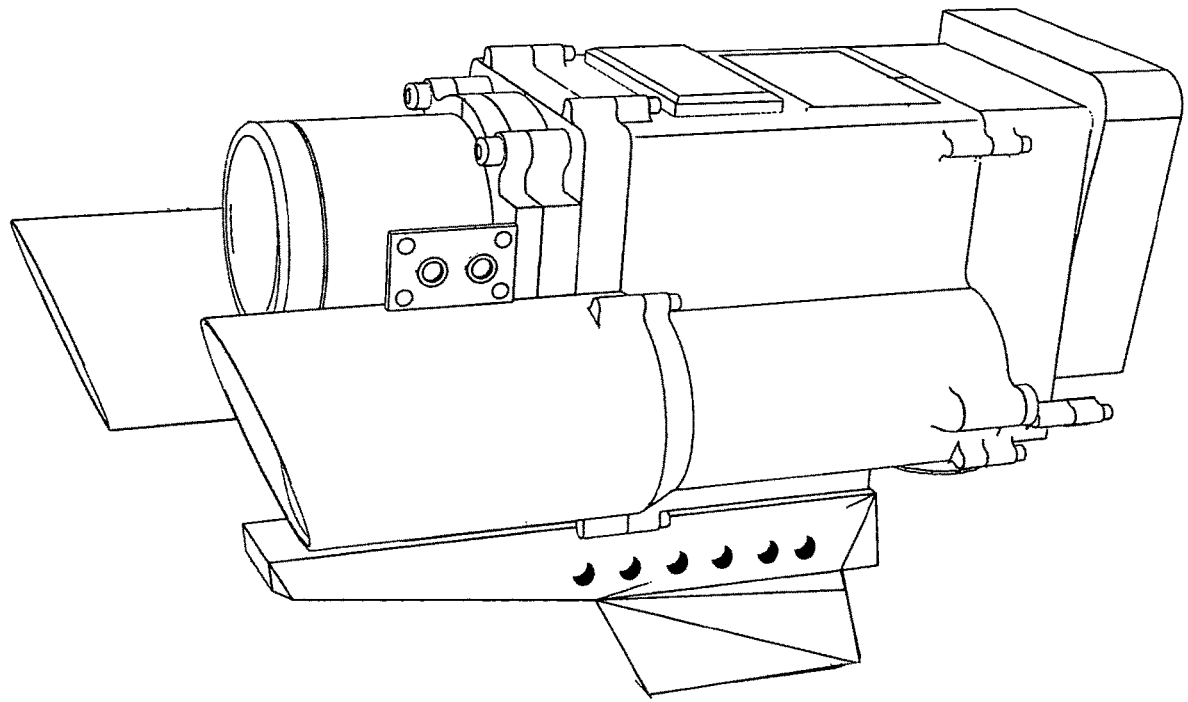
FIGS. 17A and 17B are greyscale copies of photographs of components of the prototype system shown in FIG. 17.
Figure 17B:
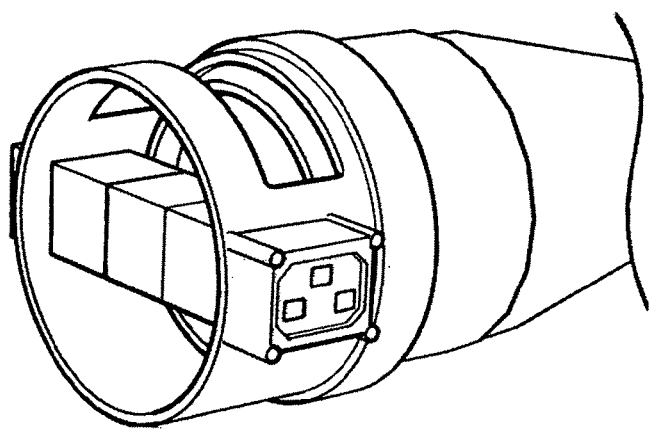

A fire control system is a clip-on attachment to direct-view rifle scopes. It is mounted directly on a rifle scope using Picatinny Rail as shown in FIGS. 17, 17A and 17B. A series of standardized clamps are located along the bottom of the fire control to provide the mounting interface to the weapon. The clamps include set screws commonly used for the mounting of riflescopes, thermal sights, and weapon mounted lighting. The mounting is compatible with the NATO Accessory Rail (STANAG 4694) and backward compatible with Picatinny Rails (MIL-STD-1913) used for the attachment of riflescopes and lighting accessories on small arms weapons. The new NATO Accessory Rail standard, adopted 2009, has tighter tolerance for straightness and pointing.

The fire control system performs several functions: i) measure the range, ii) measure atmospheric parameters, crosswind and direction, iii) calculate bullet horizontal and vertical defection using ballistic calculator, iv) image both laser beam and target for aiming, and v) displays the range, vertical hold, aim point offset (APO) and confidence circle in the rifle scope using a Rifle Display Assembly (RDA) made by Cubic Defense Corporation. The Cubic RDA is a simple attachment to the front of the rifle scope, which permits display of text and annotation on top of the scope reticle. Simple buttons provides the user a selection of several modes.

Figure 16:
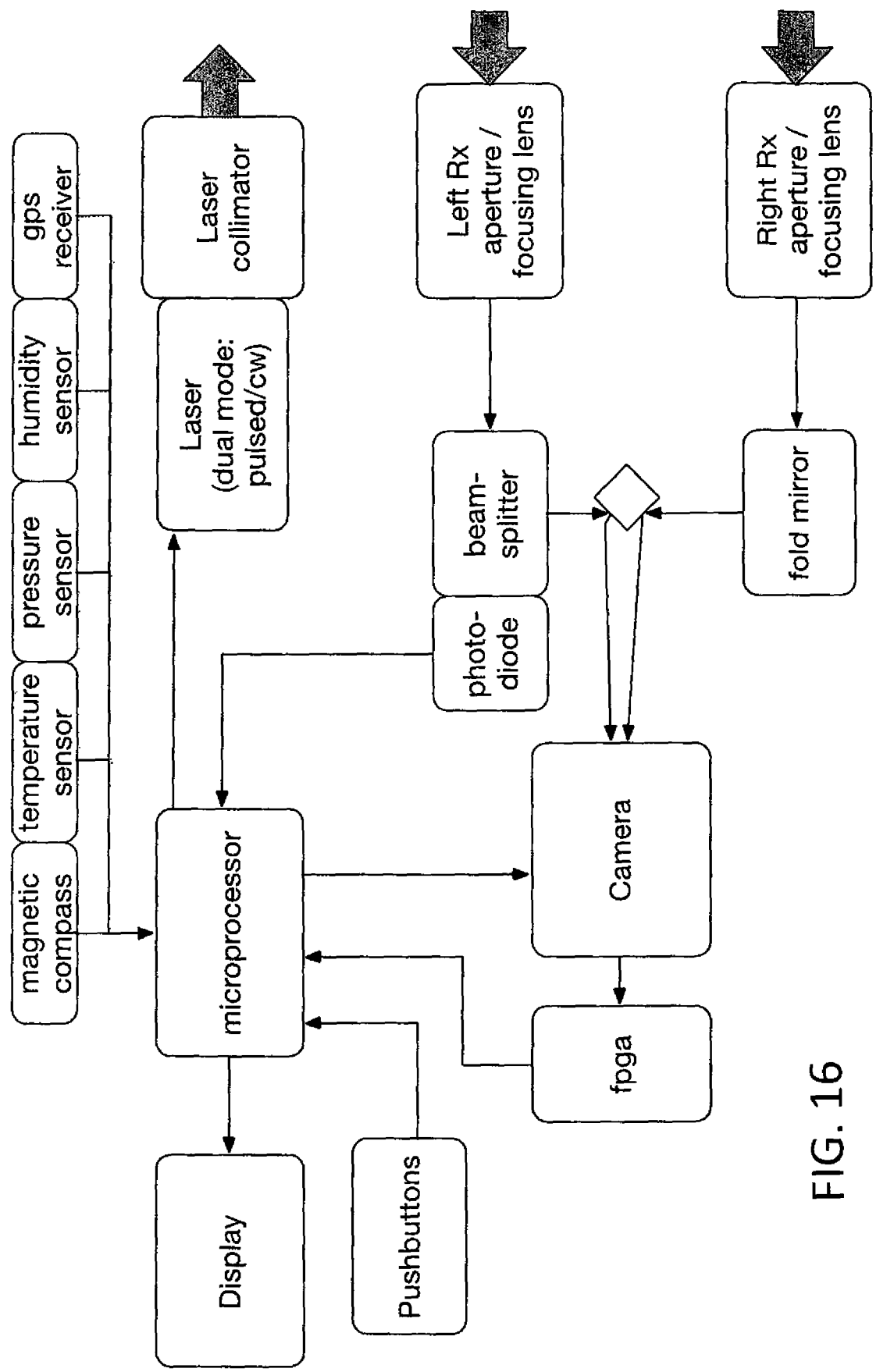
FIG. 16 is a design layout of a preferred embodiment actually built and tested by Trex and Cubic under the DARPA contract.

FIG. 17 shows an Integrated Measurement Unit (IMU) made by Cubic, which includes Trex's FPGA board with ballistic calculator and a crosswind algorithm. The IMU includes a dual made laser to measure the range in pulsed mode and cross wind in the continuous wave (CW) mode. The beam divergence is in the range from 100 μrad to 300 μrad. In cross wind measurement mode, the laser transmits in CW mode, the backscattered light collected by two horizontally separated apertures and focused on a detector (focal plane array) capable of detecting the instantaneous intensity and position of the laser spot from each aperture independently. The aperture diameter is 35 mm, focal length is 100 mm and the center to center separation is 60 mm. The angular pixel size (IFOV) is 40 μrad. And total number of pixels is 640×480. The external sensors: magnetic compass, temperature, pressure, humidity sensors, and GPS receiver provide measurements required for accurate ballistic predictions. The temperature, pressure and humidity are used to calculate the air density, relevant to determine the drag on the bullet. The magnetic compass and GPS receiver provide the direction of fire and latitude, both necessary to determine the Coriolis drift for a long range ballistic trajectory. A conceptual block diagram for a small arms fire control system including integrated cross wind measurement and ballistic calculator is shown in FIG. 16. The entire unit is battery operated and can be mounted directly on a rifle or spotter scope.

This system is designed to perform several functions: i) measure the range, ii) measure crosswind and atmospheric parameters, iii) calculate bullet horizontal and vertical defection using ballistic calculator, and iv) image both laser beam and target for aiming. This system can be used as a clip-on attachment to the direct-view rifle scopes.

A dual mode laser is used to measure the range in pulsed mode and cross wind in the continuous wave (CW) mode. Range is measured based on the usual time of flight from the laser pulse out of the transmitter to the receiver detector (photo-diode connected to the left receive aperture). The laser is transmitted through a collimator (25 mm diameter) to provide a small spot on the target at long range.

The spot image is focused onto the left and right halves of the focal plane array, separated by a baffle to prevent cross talk between the two apertures. The crosswind was calculated using auto-covariance and cross-covariance of two time varying signals recorded by two channels. The system microprocessor determines location of two image spots on the focal plane array and sums up the signal from all the pixels within a 20×20 pixels window, or measures total fluxes received by two apertures as a function of time. The FPGA provides real time image processing of the two time-series signals to estimate the auto-covariance and cross-covariance as the time averages of the laser returns. One particular embodiment uses the peak method. In this approach, the time lag of the peak of the cross-covariance function is measured, or time required for the crosswind to move the turbulence eddies from the optical axis for the left aperture to the optical axis of the right aperture. The crosswind direction is determined by the sign of the peak of the cross-covariance. The path-integrated crosswind velocity is determined by the ratio of the center to-center separation between two apertures to the peak time lag.

Another approach for cross-covariance analysis is based on determination of the crossing point between auto-covariance and cross-covariance functions (Briggs method). In this method, the crosswind velocity is determined by the ratio of the center to-center separation between two apertures to the crossing point time multiplied by 2. This approach has an advantage, as compared with the peak method, that is less sensitive to the wind velocity fluctuations. This approach provides more accurate wind measurements, when the wind direction is predominantly head or tail.

All the sensor measurements including the crosswind and target range combined with the bullet characteristics (mass, ballistic coefficient, length, caliber) input by the user through the pushbuttons are used in the internal ballistic calculator to provide the horizontal and vertical offsets from the line of sight for the bullet deflection. The results are displayed to the user along with other information on the display. The microprocessor does all: calculates, controls the laser and camera, and reads all sensors.

The Effect of Two-Way Propagation

The effect of two-way propagation through turbulence on scintillation statistics was studied in (M. Belenkii "Effect of residual turbulent scintillation and a remote-sensing technique for simultaneous determination of turbulence and scattering parameters of the atmosphere," J Opt. Soc. Am., vol. 11, No. 3, 1150-1158 (1994). When the size of the target is less than intensity fluctuations correlation scale, $l_T < \sqrt{\lambda L}$, where L is the range and $\lambda$ is the wavelength, according to this reference, a spatial covariance of intensity fluctuations of a reflected beam on a two-way propagation path includes four terms:

$$B(\rho_1,\rho_2) = \sigma_I^2(\rho_T) + B_{iR}(\rho_T,\rho_1) + B_{iR}(\rho_T,\rho_2) + B_R(\rho_1,\rho_2). \quad (1)$$

Here $\sigma_I^2$ is the variance of intensity fluctuations of the illuminating beam at the target from a forward propagation path, $B_{iR}$ is the mutual correlation function of intensity fluctuations on the forward and return paths, and $B_R(\rho_1, \rho_2)$ is covariance of intensity fluctuations of a reflected beam on a return path.

For preferred embodiments of the single-ended crosswind sensing systems, Applicants assume that the target size exceeds the intensity fluctuations correlation scale, $l_T > \sqrt{\lambda L}$, and that the system includes two "power in the bucket" receivers separated at fixed horizontal distance on the order of $\sqrt{\lambda L}$ are used to record a laser return. Each "power in the bucket" receiver includes an APD, or PMP, located in the image plane of the receiving lens with diameter $D \le \sqrt{\lambda L}$ and measures a total flux of energy received by the lens $P = \iint dxdy\, I(x, y)$. If a focal plane array is used to record laser backscatter light in the image plane of the lens, then all readings of the pixels illuminated by the laser return are summed up. We also assume that a laser beam with divergence $\theta$ illuminates a diffuse target and angular divergence of the illuminating beam $\theta$ exceeds the angular correlation scale of intensity fluctuations at the target, $\theta > \sqrt{\lambda/L}$. Under above conditions: $l_T > \sqrt{\lambda L}$ and $\theta > \sqrt{\lambda/L}$, turbulence—induced scintillation at the target from the forward propagation path are averaged out over the laser beam footprint at the target, $\theta L$. (term 1 in Eq. (1)), as well as mutual correlations of intensity fluctuations on the forward and return path (terms 2 and 3 in Eq. (1)) As a result, intensity fluctuations of a reflected beam on a two-way propagation path are determined predominantly by the scintillation on the return path:

$$B(\rho_1, \rho_2) \approx B_R(\rho_1, \rho_2). \qquad (2)$$

Consequently, a hard diffuse target illuminated by a laser beam in a turbulent atmosphere can be considered as an extended incoherent source with a diameter equal to $\theta L$. Note that typical values of intensity correlation scale for $\lambda = 1.55$ μm and 1 km range is $\sqrt{\lambda L} = 40$ mm and angular correlation scale is $\sqrt{\lambda/L} = 40$ μrad.

Applicants validated this theoretical prediction both theoretically and experimentally. In theoretical analysis, a wave-optics simulation model was used to simulate a Gaussian beam propagation on one-way and two way propagation paths. A 935 m propagation path was modeled using seven equally spaced turbulent layers. Each layer was generated as a phase screen and applied at the middle of each layer. The phase screens were generated with power spectrum that corresponds to turbulence power spectrum. Phase screens were shifted based on crosswind velocity and frame rate. The wind speed was V=1 m/sec, beam divergence $\theta$=115 μrad, wavelength 1.55 μm, $C_n^2 = 10^{-13}$, frame rate 500 Hz, grid size: 128×128 with 10 mm pixels. On a two-way path, Gaussian beam was propagated to the target and return back through the same phase screens. Multiple speckle realizations (up to 4096) were averaged together to minimize laser speckle effect. As an example, FIGS. 8A and 8B respectively show intensity distribution of a Gaussian beam on one-way, 935-m propagation path in 8A free space and in 8B a turbulent atmosphere at 935 m range and $C_n^2 = 1 \times 10^{-13}$ Auto-Covariance and Cross-Covariance FIG. 9 depicts the auto-covariance and cross-covariance of intensity fluctuations of a Gaussian beam on one-way and two-way propagation paths. Auto-covariance and cross-covariance of intensity fluctuations of a Gaussian beam on one-way (continuous curves) and two-way (dotted curves) propagation paths. It is seen that normalized auto-covariances on one-way and two-way propagation paths are close to each other when their values are >0.2. The peak location (time lag in the peak method) and location of the crossing point between auto-covariance and cross-covariance (Briggs method described in the Background Section) are the same for one-way and two-way propagation paths. This validates the theoretical prediction given by Eq. (2). However, the peak value of the cross-covariance on a two-way path is lower than that for one-way path. This is due to finite divergence of a laser beam, or finite size of a beam footprint at the target, when residual fluctuations from the forward propagation path at the target produce small contribution to the fluctuations of a laser beam return.

An experimental validation was performed on a 935 meter horizontal path. The auto-covariance and cross-covariance of intensity fluctuations were measured simultaneously for one-way and two-way propagation paths. On a two-way path, a hard diffuse target was illuminated with a low-speckle Gaussian beam having divergence of 150 microradians at a 935 m range. A beam reflected from the target propagated back to the transmitter/receiver. The fluctuations of a laser return were measured using two horizontally separated receivers having 35 mm diameter and separated at 60 mm.

On a one-way propagation path, at the target plane an array of LEDs with the size equal to the footprint of the illumination beam was used to illuminate two horizontally separated receivers similar to one used on a two-way propagation path. In this test the effective aperture spacing was about 40 millimeters. Using the auto-covariance and cross-covariance of intensity fluctuations on one-way (continuous curves, LED) and two-way (dotted curves, laser) propagation paths were measured simultaneously. The wind speed was also measured simultaneously with several anemometers spaced along the line of sight. The results are shown in FIGS. 10A and 10B which depict auto-covariance and cross-covariance of intensity fluctuations on one-way and two-way propagation paths. The peak to peak delay measured in FIG. 10B is in both cases is about 20 milliseconds. Under the Briggs technique discussed in the background section, wind speed is equal to twice the t, value which is about 10 milliseconds. So using either of these techniques the wind speed is estimated at 40 millimeters divided by 20 milliseconds or about minus 2 meters per second. This value corresponds to the average anemometer measurements of 1.93 meters per second. The results were basically the same for the 10A experiment where the average anemometer measurements were minus1.44 meters per second. It is seen that the normalized auto-covariance on one-way and two-way propagation path, similar to FIG. 9, are close to each other. The peak location of the cross-covariance and location of the crossing point between auto-covariance and cross-covariance for one-way and two-way propagation paths are the same.

Thus, both a wave-optics simulation and field measurements confirmed theoretical prediction that intensity fluctuations of a laser return are predominantly determined by scintillation on a return path and a hard diffuse target illuminated with a low-speckle laser beam in a turbulent atmosphere can be presented as an extended incoherent source. This important finding allows us to apply a saturation-resistant theory developed by Ocles et. in 1976 (G. F. Ocles, S. F. Clifford and Ting-i Vlang, Applied Optics, V. 15, (1976) for one-way propagation path (i.e. when transmitter and receivers are located at different ends of the path), to two-way propagation paths, when the laser beam is reflected from a diffuse target, and the transmitter and receiver are located at one end of the path.

Analytical Solution

According to this saturation-resistant theory, the integral equation for time-lagged covariance function of the amplitude (or irradiance) scintillations of a system consisting of a laser beam and two equal-aperture receivers has the form (from the Ting-I Wang et. al. paper discussed in the background section):

$$C_\chi(\rho, \tau) = 0.132\pi^2 k^2 \quad (1)$$

$$\int_0^L dz\, C_n^2(z) \int_0^\infty dK K^{-\frac{8}{3}} \sin^2\left[\frac{K^2 z(L-z)}{2kL}\right] \times J_0\left[K\left|\rho\frac{z}{L} - v(z)\tau\right|\right] \times$$

$$\left[\frac{2J_1\left(\frac{KD_R z}{2L}\right)}{\frac{KD_R z}{2L}}\right]^2 \left\{\frac{2J_1\left(\frac{KD_T}{2}\left(1-\frac{z}{L}\right)\right)}{\frac{KD_T}{2}\left(1-\frac{z}{L}\right)}\right\}^2$$

where $\rho$ is the separation between receivers, r is the time lag, $k=2\pi/\lambda$ is the wavenumber, $\lambda$ is the wavelength, L is the path length, z is the variable along the path, v(z) is the crosswind velocity at point z, $C_n^2$ is the refractive index structure characteristic, $D_R$ is the receiver diameter, and $D_T$ is the transmitter diameter, $J_0$ and $J_1$ are the Bessel function of the first kind and zero order and first order, respectively. The Eq. (1) is valid when the following condition is satisfied:

$$D_R + D_T > 2(\alpha_T^2)^{3/5}\sqrt{\lambda L}$$

The theory is based on the phenomenological model of saturation of turbulence-induced scintillation of irradiance emitted by an extended incoherent source. For this reason, this system is free from saturation effects and can operate both in the regime of weak and strong scintillation. For 1 km range and $\lambda=1.55$ μm, this system can operate when $C_n^2 < 10^{-13}$ and $C_n^2 > 10^{-13}$. For a two-way propagation path, when a laser beam illuminates a diffuse target, an effective transmitter diameter at the target is determined by the beam divergence of the illuminating beam $D_R = \varphi \times L$, where $\varphi$ is the beam divergence.

The Eq. (1) defines a relationship between spatial-temporal cross-covariance function and crosswind velocity profile $v(z)$. However, in the current form it cannot be used for crosswind profile reconstruction because this equation is non-linear—the wind profile is included in the argument of the Bessel function of the first kind. In order to reconstruct the crosswind velocity profile from the measurements of the time-lagged covariance, Eq. (1) must be linearized. Our goal is to derive a linear equation in the form:

$$\text{Measurement} = \int_0^L dz\, v(z) * F(D_R, D_T, k, z). \quad (2)$$

This equation relates measurements and the cross-wind profile, v(z). Function $F(z, k, D_R, D_T)$ is the path-weight function, which determines the contribution to the measurement provided by the crosswind at different range bins along the path.

A method for linearization of Eq. (1) is the following. It uses the fact that in the vicinity of the peak of time-lagged cross-covariance function $C_\chi(\rho, \tau)$, defined by condition $$\frac{\partial C_\chi(\rho, \tau)}{\partial \tau} = 0,$$

the argument of the Bessel function of the first kind and zero order $$\left(J_0\left[K\left|\rho\frac{z}{L} - v(z)\tau\right|\right]\right)$$

is small. Consequently, in the vicinity of the peak of the cross-covariance the Bessel function can be expanded in the Tailor series and approximated by the expansion: $J_0(x) \approx 1 - 0.25*x^2$. After that, we calculate the derivative of $C_\chi(\rho, \tau)$ in terms of $\tau$ and set the derivative equal to zero:

$$\frac{\partial C_\chi(\rho, \tau_0)}{\partial \tau} =$$

We will substitute the Bessel function $J_0(x)$ in Eq. (1) with it's approximation in the form of a series solution and calculate the derivative of $C_\chi(\rho, \tau)$ in terms of $\tau$ and set the derivative equal to zero:

$$\frac{\partial C_\chi(\rho, \tau)}{\partial \tau} = \quad (3)$$

$$0.5\, A C_n^2 \int_0^L dz\, v(z)\left(\frac{\rho z}{L} - v(z)\tau\right) \int_0^\infty dK K^2 G(K, z, k, D_R, D_T) = 0$$

Here, $A = 0.132\, \pi^2 k^2$, $C_n^2$ is assumed constant, $D_T = L*\varphi$ and $$G(K, z, k, D_R, D_T) = K^{-8/3}\sin^2\left[\frac{K^2 z(L-z)}{2kL}\right] \times$$

$$J_0\left[K\left|\rho\frac{z}{L} - v(z)\tau\right|\right] \times \left[\frac{2J_1\left(\frac{KD_R z}{2L}\right)}{\frac{KD_R z}{2L}}\right]^2 \left\{\frac{2J_1\left(\frac{KD_T}{2}\left(1-\frac{z}{L}\right)\right)}{\frac{KD_T}{2}\left(1-\frac{z}{L}\right)}\right\}^2.$$

Solving Eq. (3) for $\tau$ yields:

$$\tau = \frac{\int_0^L dz\, v(z)\frac{\rho z}{L}\int_0^\infty dK K^2 G(K, z, k, D_R, D_T)}{\int_0^L dz\, v(z)^2 \int_0^\infty dK K^2 G(K, z, k, D_R, D_T)}. \quad (4)$$

Path-Weighting Function Solution

This equation can be re-written in the form of a traditional path-weighting function solution, $$\text{Measurement} = \int_0^L dz\, v(z) * F(D_R, D_T, k, z),$$

where $F(D_R, D_T, k, z)$ is the path-weighting function, $$F(D_R, D_T, k, z) = \int_0^\infty dK K^2 G(K, z, k, D_R, D_T) \quad (5)$$

$$= \int_0^\infty dK\, K^{-2/3}\sin^2\left[\frac{K^2 z(L-z)}{2kL}\right] \times$$

$$J_0\left[K\left|\rho\frac{z}{L} - v(z)\tau\right|\right] \times$$

$$\left[\frac{2J_1\left(\frac{KD_R z}{2L}\right)}{\frac{KD_R z}{2L}}\right]^2 \left\{\frac{2J_1\left(\frac{KD_T}{2}\left(1-\frac{z}{L}\right)\right)}{\frac{KD_T}{2}\left(1-\frac{z}{L}\right)}\right\}^2.$$

Figure 1:
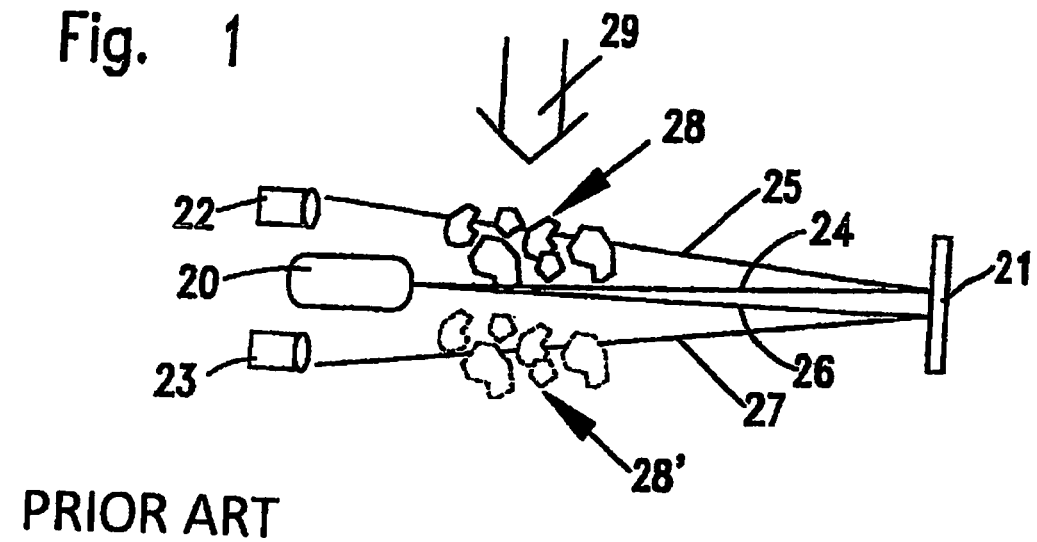
FIG. 1 is a prior art drawing from U.S. Pat. No. 6,247,259 illustrating a technique for crosswind measurement using a laser beam and two high speed cameras to record approximately parallel beams of light reflected from a target region.
Figure 1A:
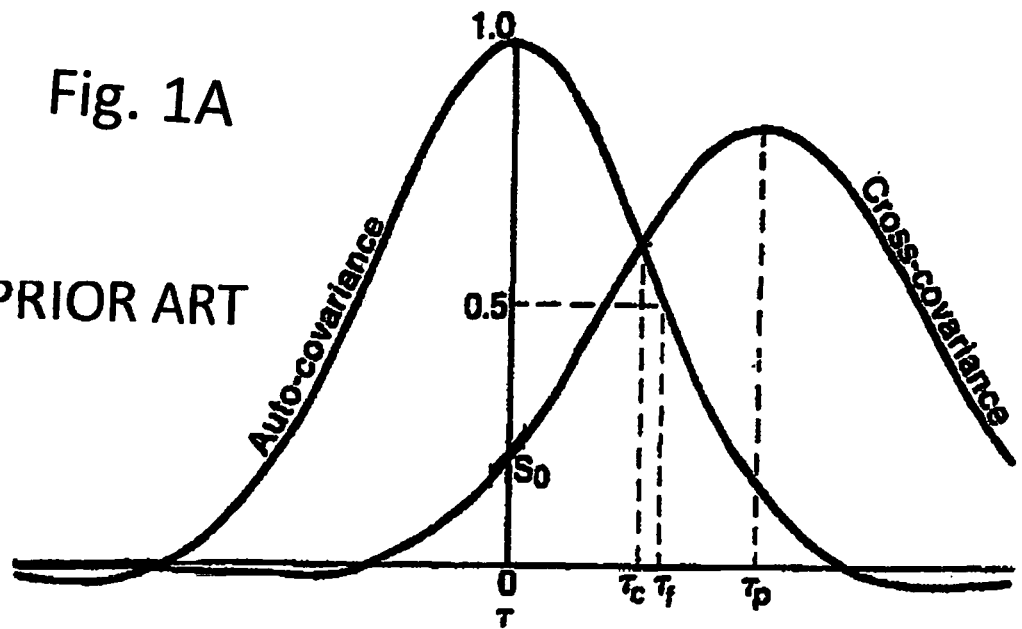
FIG. 1A shows typical normalized time-lagged auto-covariance and cross-covariance functions of the optical wind sensor described briefly in FIG. 1.
Figure 4A:
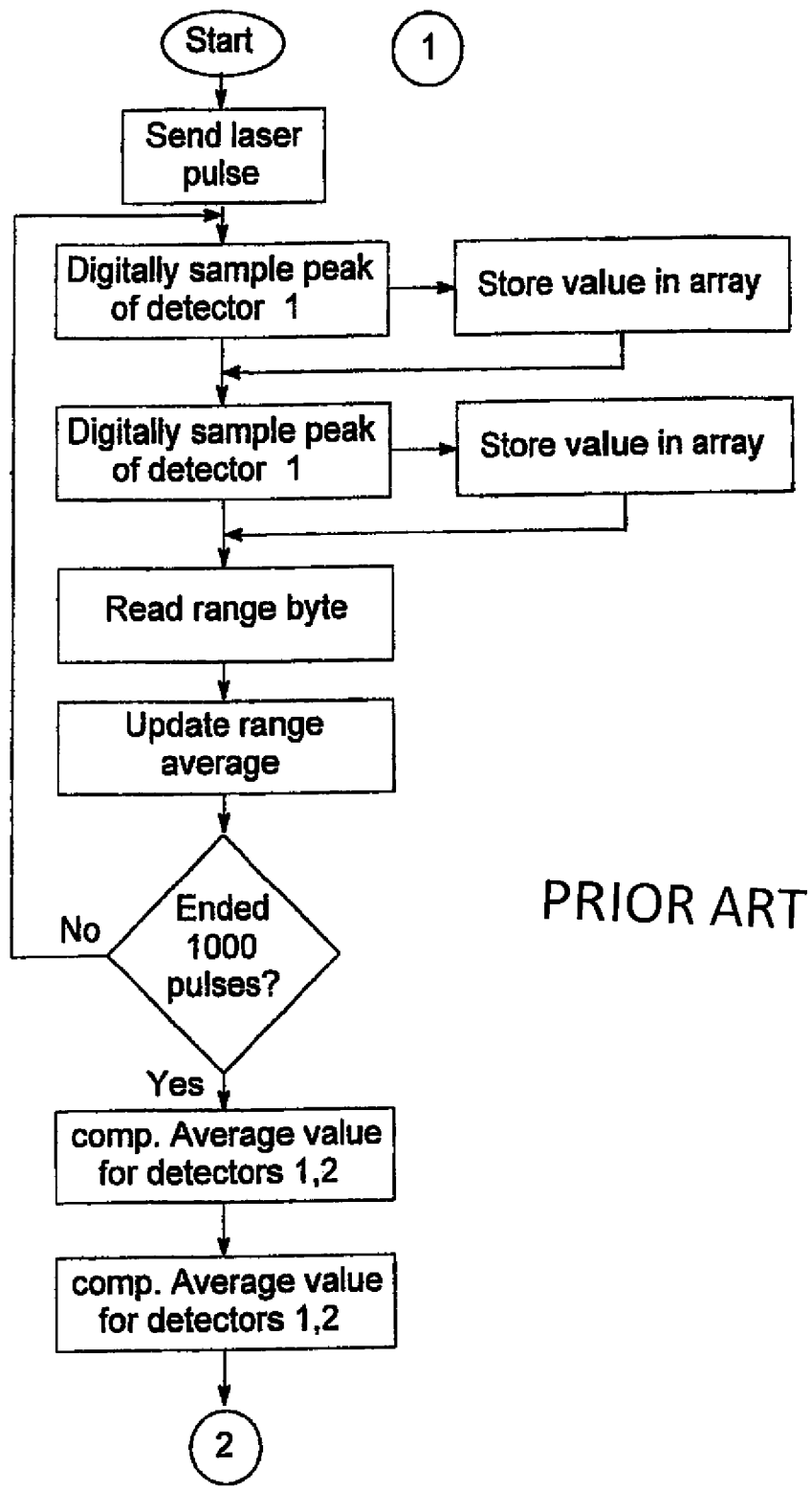
FIGS. 4A, 4B and 4C constitute in succession show a general flow chart of the software used in an apparatus according to prior art U.S. Pat. No. 6,247,259.
Figure 4B:
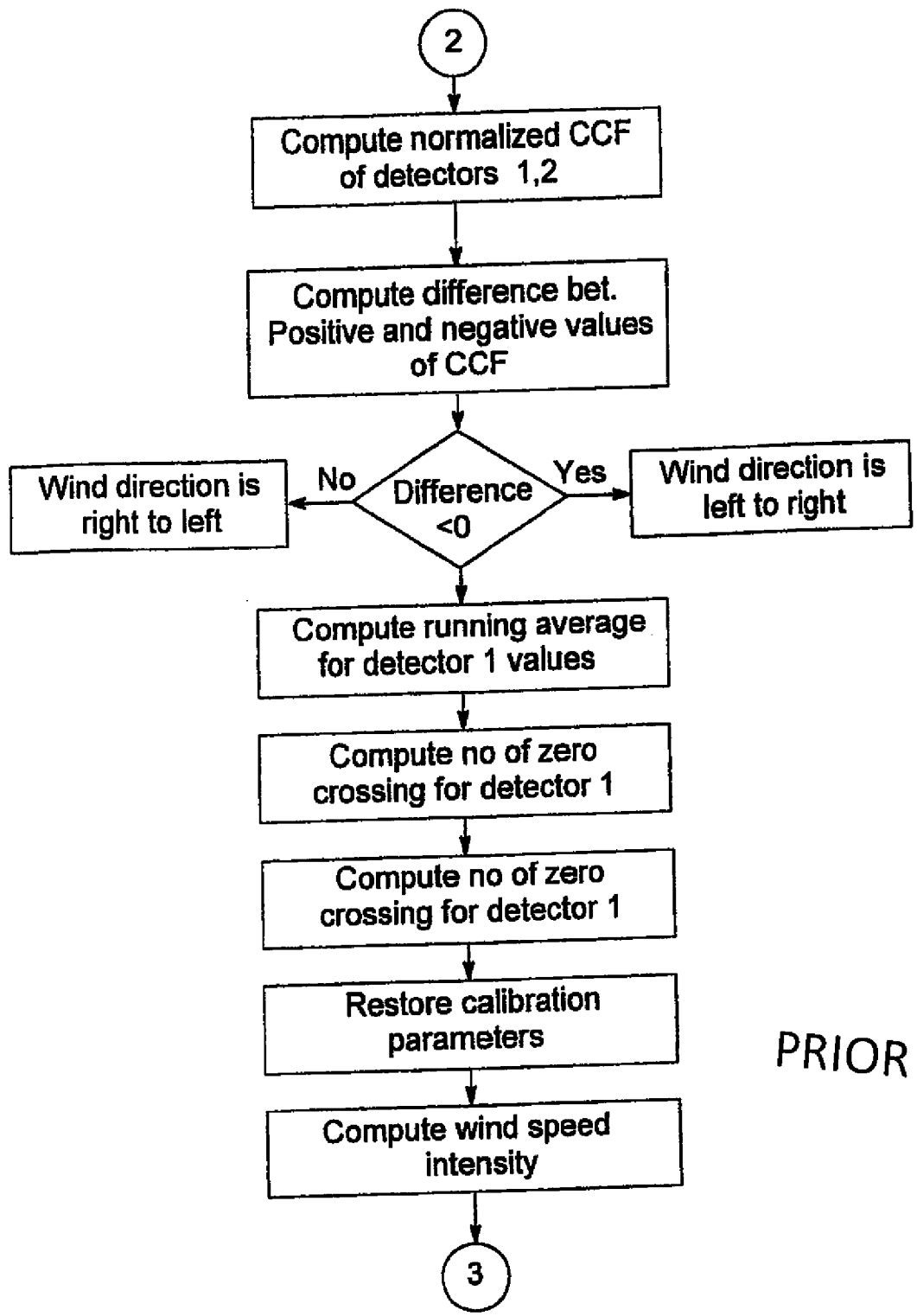
Figure 4C:
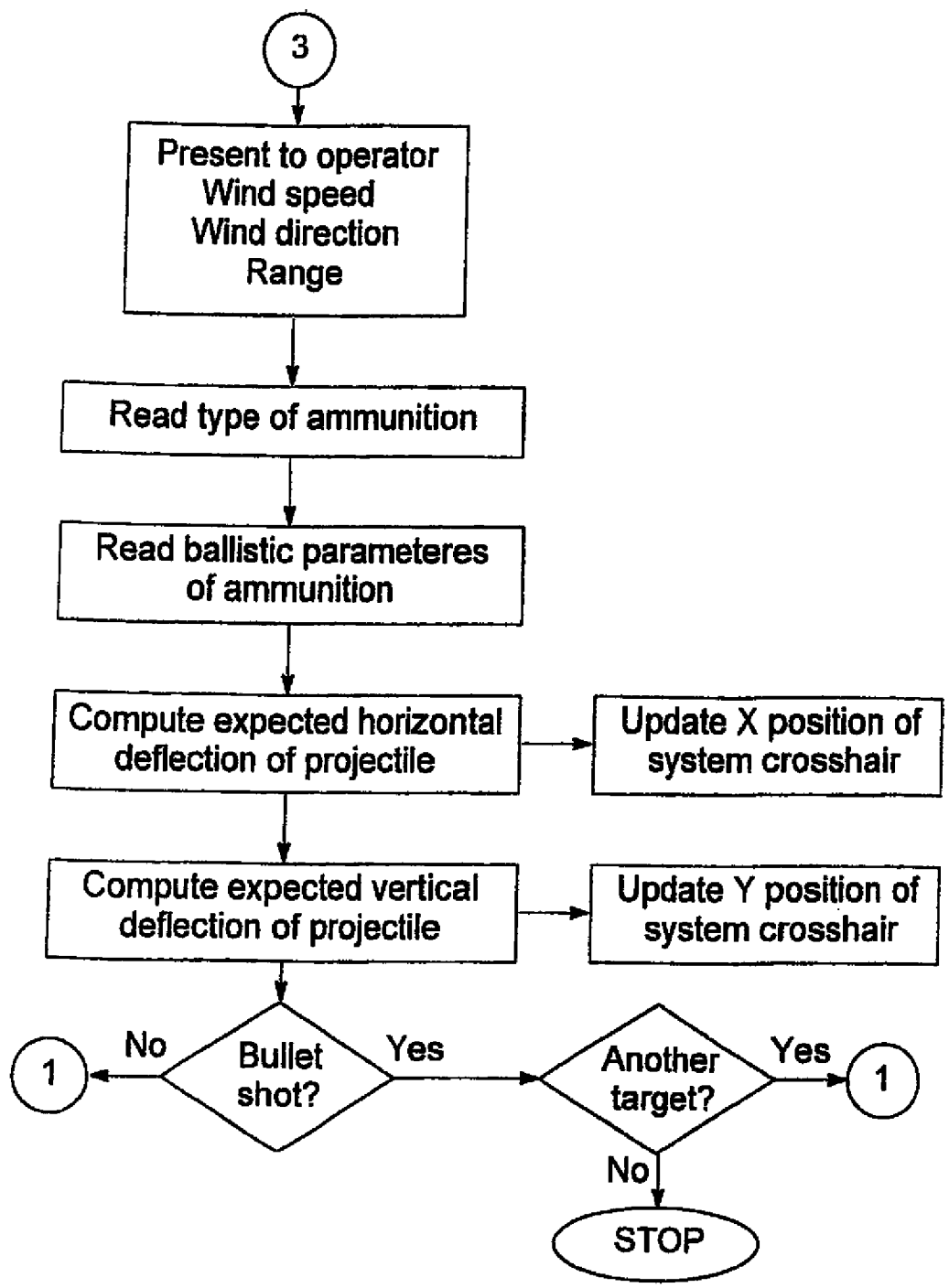
Figure 5:
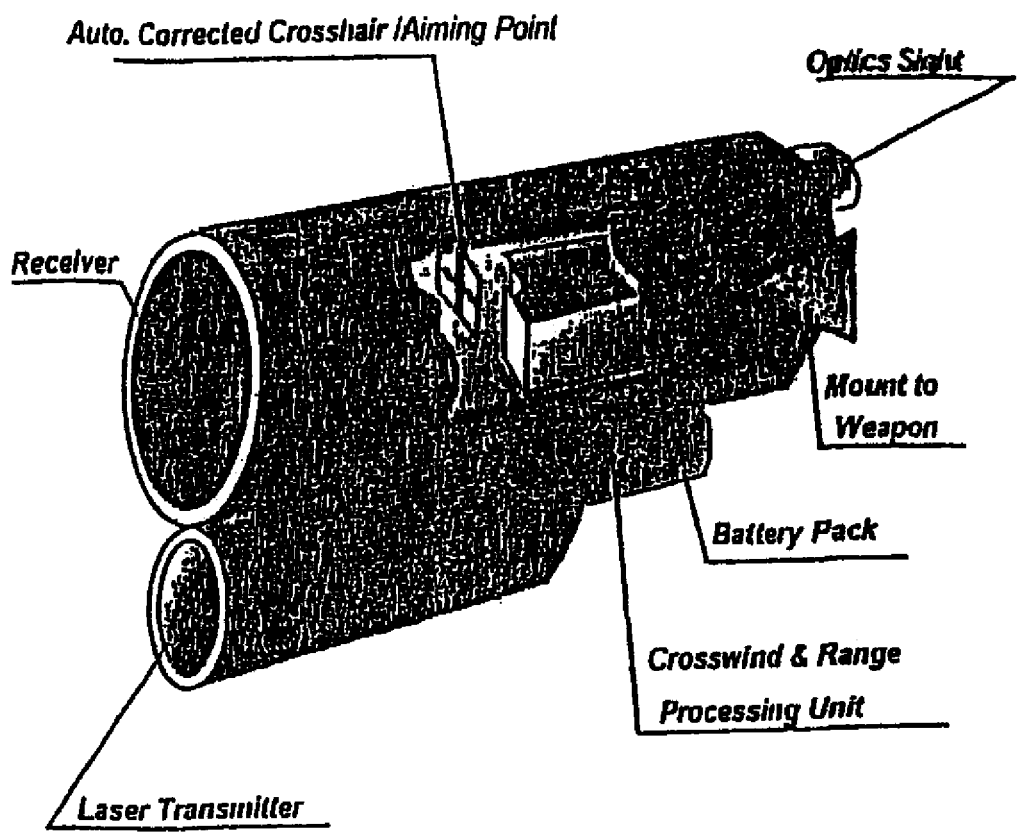
FIG. 5 is a copy of FIG. 5 of prior art U.S. Pat. No. 6,247,259 showing a schematic perspective view of an apparatus according to an embodiment of the invention covered by the prior art patent.
Figure 6:
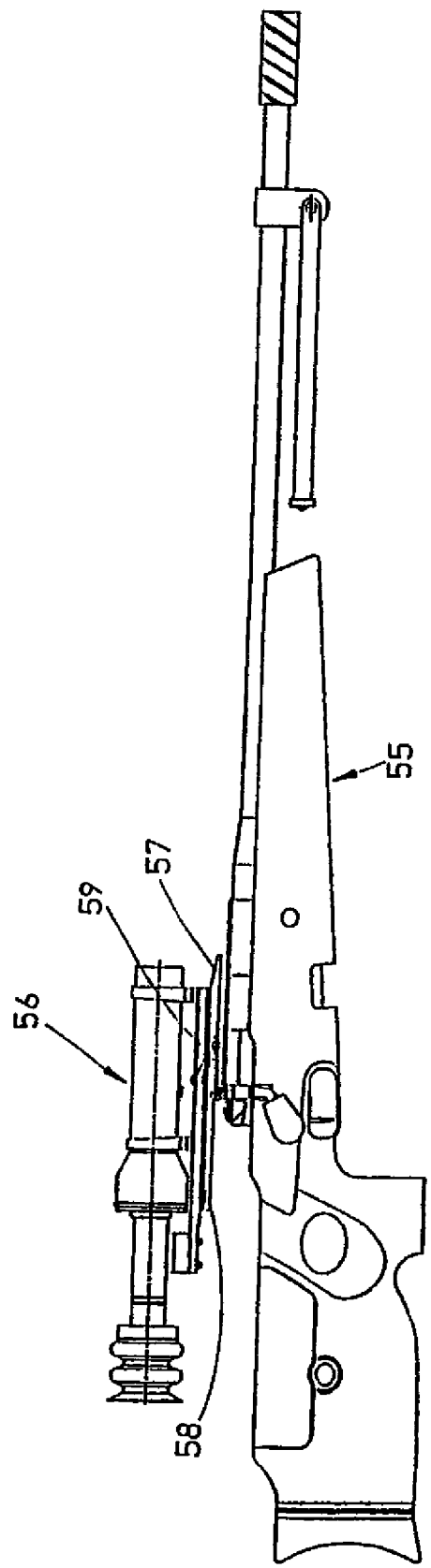
FIG. 6 is a copy of FIG. 6 of prior art U.S. Pat. No. 6,247,259 showing a schematic lateral view showing the apparatus of FIG. 5 applied to a conventional rifle.
Figure 7:
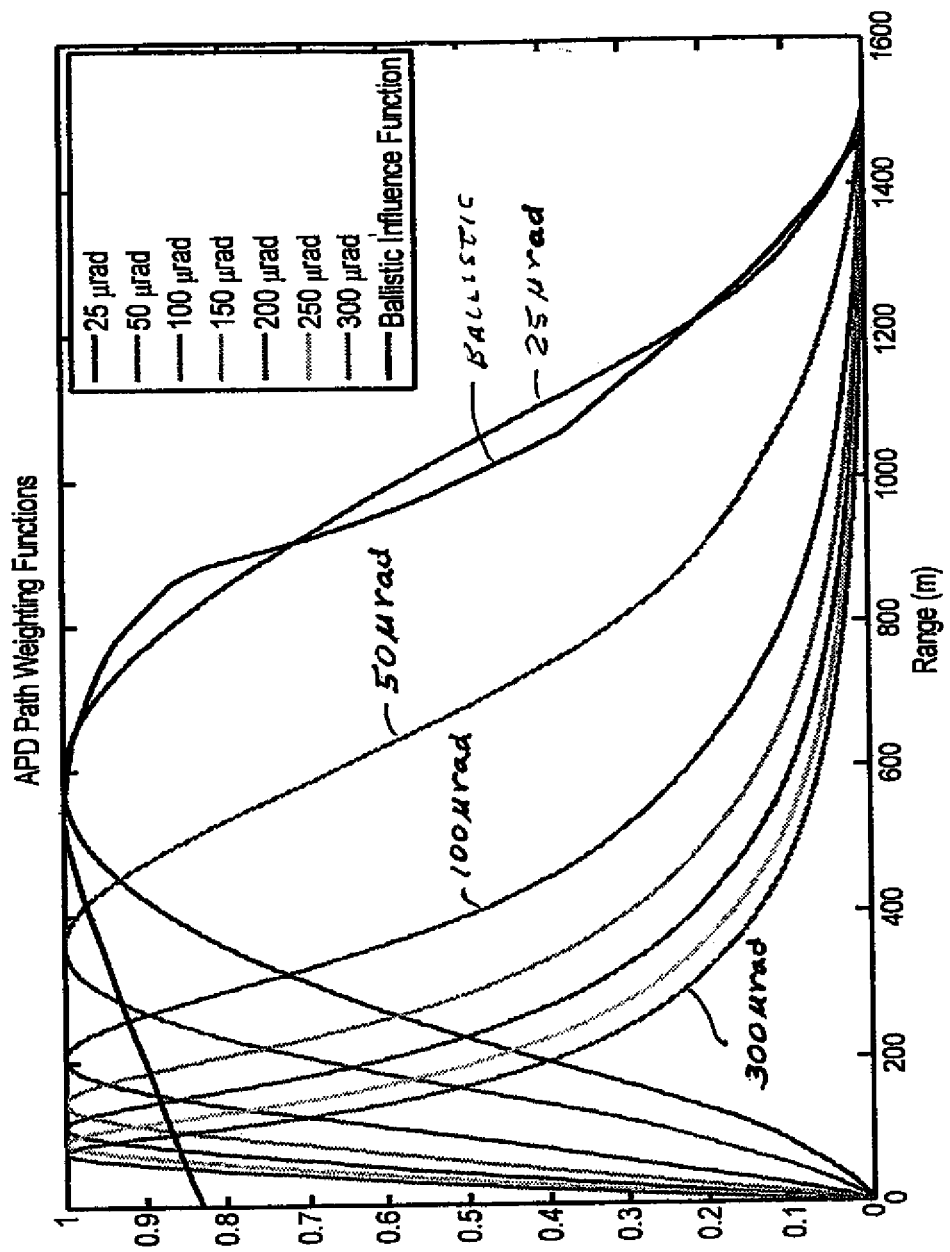
FIG. 7 is a drawing prepared by Applicants illustrating path weighting functions useful in preferred embodiments for estimating crosswinds.

The path-weighting functions (PWFs) for the proposed approach calculated using Eq. (5) for a 1.5 km range, 1.55 micron wavelength, 2.5 cm receiver diameter and beam divergence φ varying from 25 μrad up to 300 μrad are shown in FIG. 7. This plot also includes a ballistic influence function (black curve) for a 0.308 round. It is seen that the PWFs for different beam divergences sample crosswind at different locations along the range. The PWFs cover an entire portion of the path that provides the main contribution to the bullet deflection defined by the ballistic influence function (black curve). This provides accurate sampling of the cross-wind profile over the entire range that affects the bullet deflection.

Crosswind Profile Reconstruction

It is seen that the path-weighting function peaks at different ranges and "samples" crosswind velocity at different range bins along the LOS when the beam divergence and a beam foot print diameter at the target changes. This finding leads us to the concept of crosswind profile measurements using a varying beam divergence.

By re-writing Eq. (4) in the form $$\text{Measurement} = \tau_p^{-1} = \frac{\int_0^L dz\, v(z)^2 F(D_R, D_T, k, z)}{\rho \int_0^L dz\, v(z) \frac{\rho z}{L} F(D_R, D_T, k, z)} \quad (6)$$

one can find a solution for crosswind. If the crosswind is constant, $v(z)=\text{constant}=v_0$, then Eq. (6) has the form $$\text{Measurement} = \tau_p^{-1} = \frac{v_0 \int_0^L dz F(D_R, D_T, k, z)}{\rho \int_0^L dz \left(\frac{z}{L}\right) * F(D_R, D_T, k, z)}. \quad (7)$$

So, the path-integrated crosswind is given by the equation $$v_{\text{eff}} = v_0 = \frac{\rho_{\text{eff}}}{\tau_p}, \text{ where } \rho_{\text{eff}} = \frac{\int_0^L dz \left(\frac{z}{L}\right) F(D_R, D_T, k, z)}{\int_0^L dz F(D_R, D_T, k, z)} \quad (8)$$

is the effective separation between two receivers.

If the crosswind is constant, then one can determine the path-integrated crosswind from measurements of optical scintillations in a laser return using Eq. (8).

In general case, when crosswind $v(z)$ varies along the path, a linear equation between a crosswind profile, $v(z)$, and measurement is required in order to reconstruction the crosswind profile from the scintillation measurements of the laser return. In order to solve Eq. (6) for $v(z)$, we will re-write Eq. (6) in the form $$\text{Measurement} = \frac{Cd}{\tau_p} = \int_0^L dz\, v_i(z) * F_i(D_R, D_T, k, z), \quad (9)$$

where $F_i(D_R, D_T, k, z) = F(D_R, D_T, k, z) * v_{i-1}(z)/v_0$ is a generalized path weighting function, which includes a crosswind profile, and $$Cd = \rho \int_0^L dz \left(\frac{z}{L}\right) * F_i(D_R, D_T, k, z) = \text{constant}$$

and use an iterative process, where i=1, 2 . . . is the number of iterations, and the initial guess for crosswind profile $v(z)$ is a constant crosswind $v_0(z)=\text{constant}$. For i=1, by solving Eq. (9) for $v_1(z)$ using $F_1(D_R, D_T, k, z)=F(D_R, D_T, k, z)$, the first-order approximation for the crosswind profile $v_1(z)$ is determined. Once this solution is found, the path-weighting function is updated as $F_2(D_R, D_T, k, z)=F(D_R, D_T, k, z)*v_1(z)/v_0$ and a second-order solution for crosswind profile is determined from Eq. (9)

$$\text{Measurement} = \frac{Cd}{\tau_p} = \int_0^L dz\, v_2(z) * F_1(D_R, D_T, k, z).$$

Figure 11:
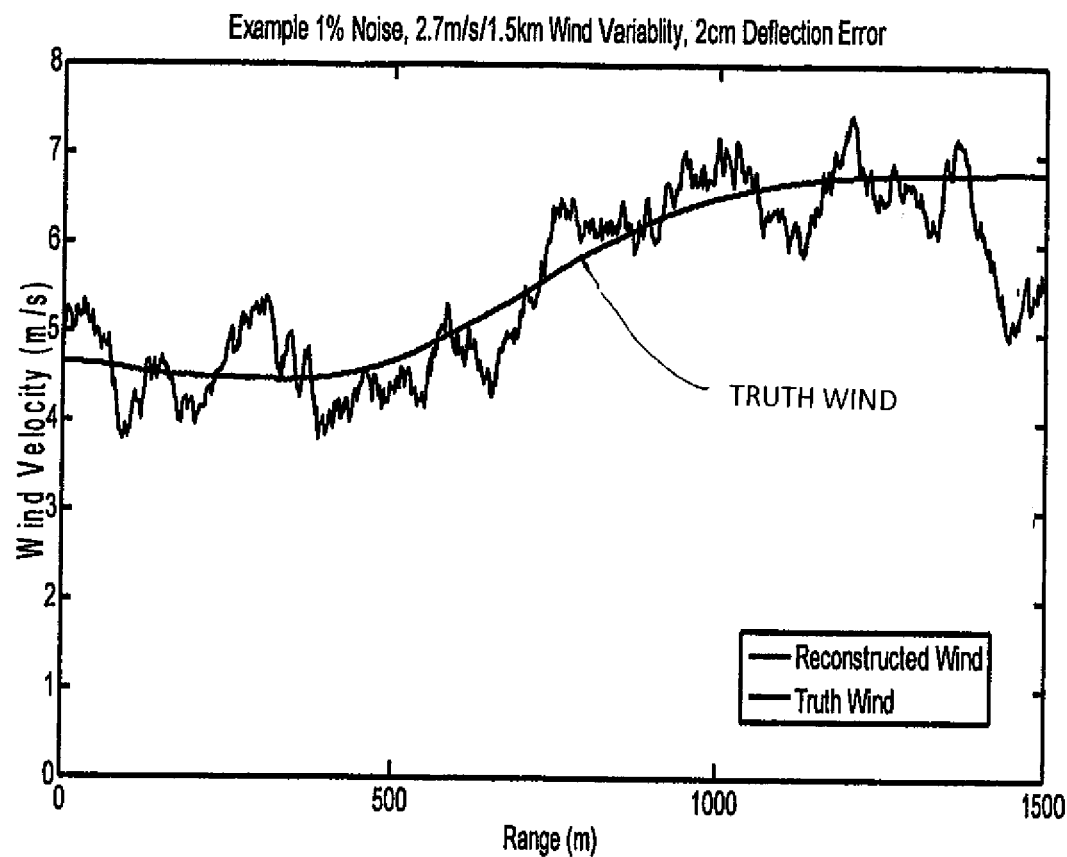
FIG. 11 shows a crosswind profile reconstructed by inverting matrix given Eq. (11) using least squares solver as compared to a truth wind curve at the 1500 meter range.

The simulation study revealed that this process converges very quickly. In order to reconstruct the crosswind profile, the cross-covariance measurements must be performed using variable beam divergence $\varphi_k$, k=1, 2, . . . , n. When n=1, the solution collapses to a constant path-integrated crosswind, $v_0$. For variable beam divergence, n≥2, an integral in Eq. (9) is approximated by the sum $$\text{Measurement}_k = \Sigma_{j=1}^m v(j) F_k(j) \quad (10)$$

where $\varphi_k$, k=1, . . . ,n are different beam divergences and m is the number of range bins along the path. The algorithm known as an "a priori under constraint linear inverse solver" is used for crosswind reconstruction from Eq. (10). One example of the reconstructed crosswind profile is shown in FIG. 11.

The basic problem format can be stated as the simultaneous solution to the measurement & $F_i(z)$ equations combined with the a-priori model equations with appropriate weightings for each equation based on the uncertainty of the measurements or a-priori knowledge. For the Brownian Motion wind Reconstruction model, the series of a-priori equations are:

$$v_{j+1} = v_j + N(0, \sigma), \text{ weighted by } \frac{1}{\sigma^2}$$

The weighting is used when all the a-priori equations and the measurement equations are combined to solve simultaneously in a least squares sense. Where, N(0,σ) is zero mean a standard deviation Gaussian distribution, σ is the expected statistical sqrt (variance) from one range bin (j) to the next range bin (j+1). The solution is estimated with a typical expected value. This method is not overly sensitive to the chosen value of σ and gives good results with values that deviate from the true values by up to a factor of 10×. This formulation yields m−1 equations, where m=the number of range bins we wish to solve for the cross-wind profile.

We have n measurement equations that are of the form:

$$\text{measurement}_i = \sum_{j=1}^m v(j) F_i(j)$$

and correspond to $\varphi_i$, i=1, . . . n beam divergences. The above equations will be weighted by $1/\psi^2$ where $\psi$ is the one-σ uncertainty in the measurements space-time covariance function $C_\chi(\rho, \tau)$. This yields m−1+n equations and m unknowns, so for any n≥1 measurements, we can reconstruct a wind profile. Notice that for n=1, the problem is not overly constrained, so any weights that go into the least squares solution are ignored, and we are left with constraints that $v_{j+1}=v_j+0$, so the solution will collapse to a constant wind speed, which is expected since we only have one measurement and thus can only measure an average wind speed. However this is not a special case that need be adjusted for, but only an example of this robust method yielding a constant wind profile in a scenario that we would expect.

This method is a generic method that can be used for any combination of PWFs that can be put into the appropriate linear form combined with any a-priori knowledge that can also be put into a linear form. The precision of the results will then be dependent on the quality of the PWF and the quality of the a-priori knowledge.

Figure 12:
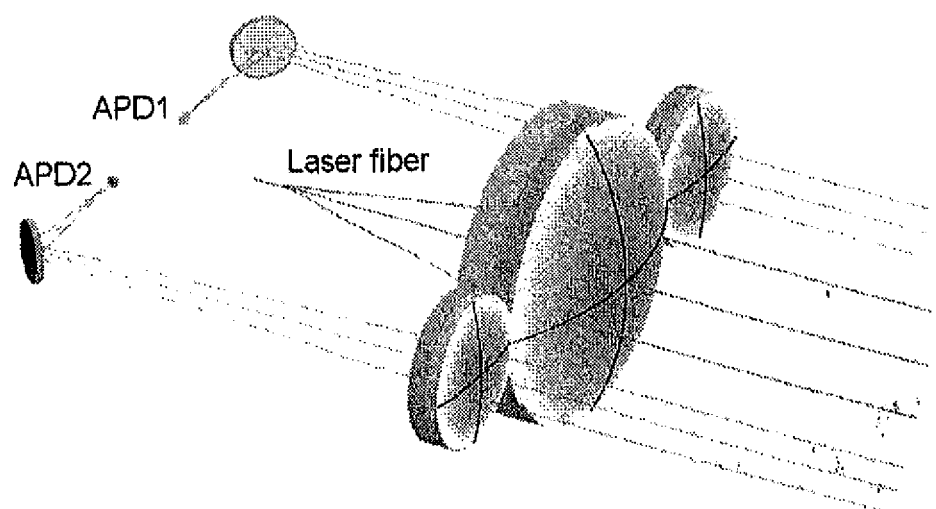
FIG. 12 shows the important optical features of a preferred embodiment for crosswind speed measurements.
Figure 15:
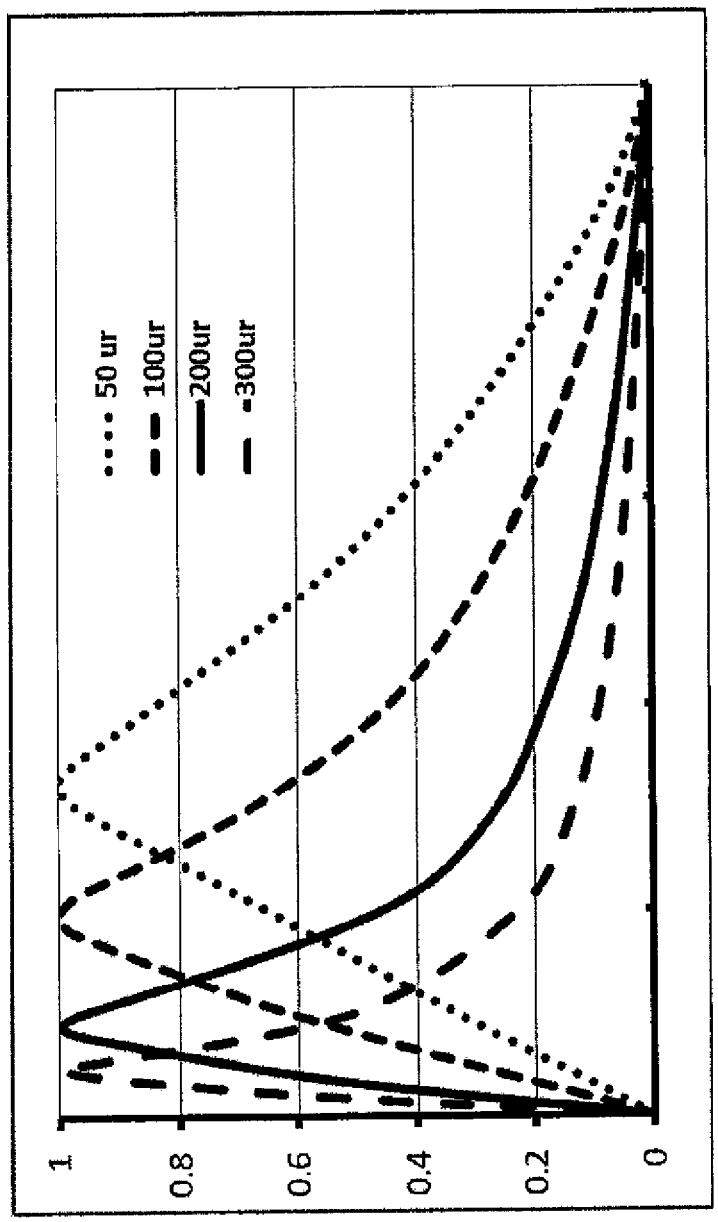
FIG. 15 is a copy of FIG. 15 of U.S. Pat. Nos. 9,127,911 and 9,157,701 and 9,347,742 showing examples of four different weighting functions, which are produced by varying the laser divergence, for use by a processor in determining and combining multiple path-weighted average crosswinds according to an exemplary embodiment Applicants contend have been derived from the work of the present Applicants.

The mathematical form of this given problem is:

$$\begin{bmatrix} F_{11} & F_{12} & F_{13} & F_{14} & F_{15} & F_{1m} \\ F_{21} & F_{22} & F_{23} & F_{24} & F_{25} & F_{2m} \\ F_{n1} & F_{n2} & F_{n3} & F_{n4} & F_{n5} & F_{nm} \\ 1 & -1 & 0 & 0 & 0 & 0 \\ 0 & 1 & -1 & 0 & 0 & 0 \\ 0 & 0 & 1 & -1 & 0 & 0 \end{bmatrix} v = \begin{bmatrix} M_1 \\ M_2 \\ M_3 \\ 0 \\ 0 \\ 0 \end{bmatrix} \quad (11)$$

Where v is solved for with a least squares solver, $M_1, \ldots, M_n$ are measurements, and each row is weighted as stated earlier. The crosswind profile sensor requires a laser transmitter with variable beam divergence and two spaced optical receivers. A suggested optical layout is shown in FIG. 12. Three optical apertures are required for a laser transmitter and two receivers. Note the colors are for illustration only; all wavelengths are the same 1550 nm. The lens used to collimate the transmitting laser beam is centered, with a fiber input. Adjacent to that lens are two smaller lenses, each capturing light reflected from a target and focusing onto its own detectors: PIN photodiodes, APDs, or on the imaging camera pixels. Such a design concept provides good optical isolation between transmit and receiving channels. The fold mirrors are used to make the system more compact and place all of the electronics and fiber connector on one small assembly. For even greater compactness, the lenses can be trimmed square or rectangular to reduce wasted space. Embodiments include off-the-shelf portable optical transmitter for generating a variable beam divergence, a portable optical receiver, a display monitor for displaying aim point information and processor such as a FPGA. Two measurement channels are separated in the horizontal direction at the distance, which is on the order of the characteristic scale of intensity fluctuations given by $\sqrt{\lambda L}$. At 1 km range and 1.55 μm wavelength the receiver separation is on the order of 40 millimeters. Example of simulated cross-wind profiles (true wind) and resultant profile reconstructions (reconstructed wind) using cross-covariance estimates for four beam divergences is shown in FIG. 11. FIG. 15 depicts path-weighting functions for four beam divergences varying from 50 micro radians to 300 micro radians for an airborne application, which is a copy of a document delivered in confidence by e-mail to Dr. Varshneya at DARPA on Apr. 26, 2012.

Variable Laser Beam Divergence

When a laser beam propagates to the target, it is modulated by turbulence eddies driven by the wind. A laser beam creates a time varying scintillation pattern on the target. When a reflected beam travels back to the receivers it is modulated by turbulent eddies again and creates a time varying scintillation pattern at two receivers. When a spatial-temporal cross-covariance is measured using two measurement channels by averaging multiple short-exposure samples over time (on the order of 0.5 sec to 1 sec), the scintillation from the forward propagation path are averaged out over the beam footprint angular extent at the target and over the receiving aperture. Two last terms in the expression for the cross-covariance function given by Eq. (1), which depend on the transmitter diameter $D_T$ and receiver diameter $D_R$, describe an averaging of the turbulence-induced scintillation by the transmitter and receiver.

Figure 12A:
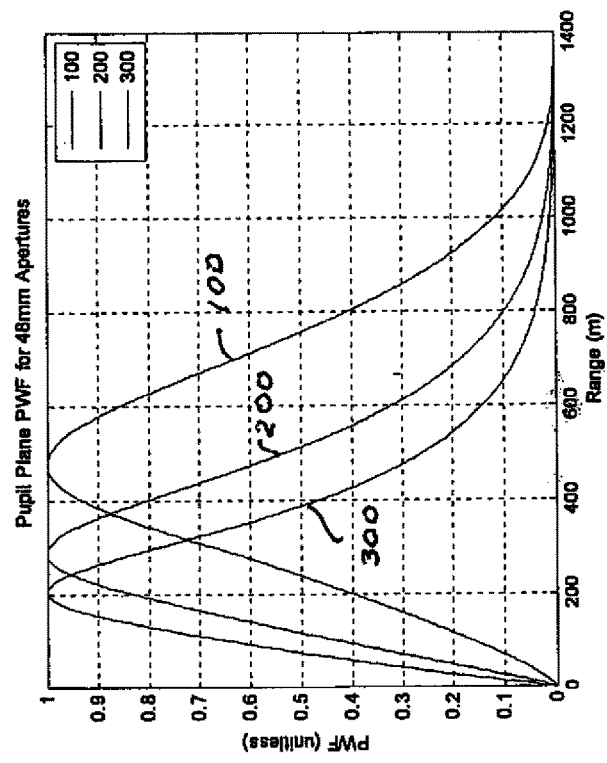
FIGS. 12A and 12B show path weighting function curves for 1000 meter and 1500 meter ranges with divergences of 100, 200 and 300 micro-radian divergences at the pupil plane.
Figure 12B:
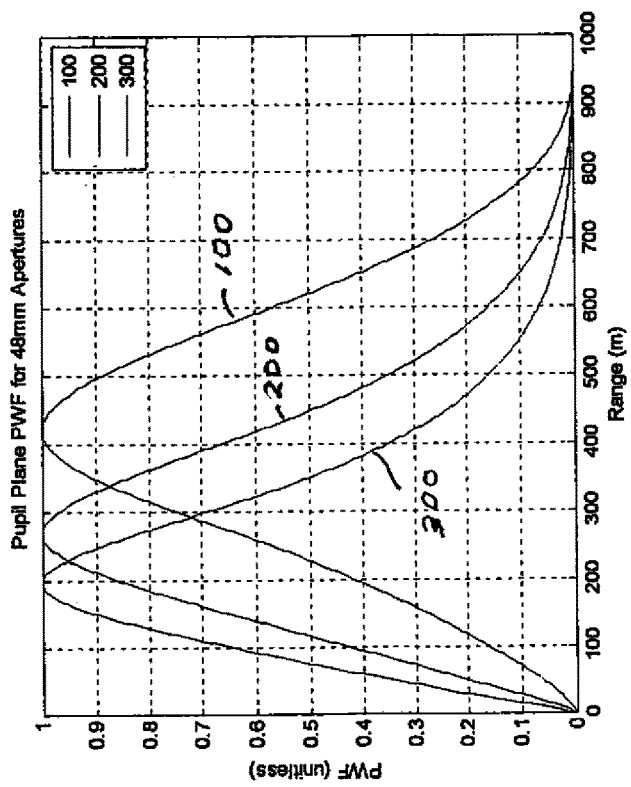

The path-weighting function defines a relative contribution of the given range bin along the path to the measured downrange crosswind velocity. A derived expression (5) for the path-weighting function $F(D_R, D_T, k, z)$ includes the same two terms that describe an averaging of scintillation on a return path by the transmitting aperture of a secondary source at the target $D_T$, which depends on laser beam divergence, $D_T=\varphi \times L$, and receiving aperture, $D_R$. When $D_T=D_R$, the path-weighting function is symmetrical, and the peak of the path-weighting function is located at the middle of the path. When the beam divergence $\varphi$ increases, an averaging of scintillation by a secondary source at the target increases, as compared to the scintillation averaging by a receiver, and the peak of the path-weighting function is shifted towards the receiver. This effect is illustrated in FIGS. 12A and 12B, which show path-weighting functions for three beam divergences at 1 km and 1.5 km ranges. The implication is that by changing a beam divergence of the outgoing beam, a crosswind sensor can sample a crosswind velocity at different locations along the line of sight. From the measurements of the auto-covariance and cross-covariance for different beam divergences, a crosswind profile can be reconstructed by solving a matrix equation (11) using a least square solver. For a single beam divergence, the system determines a constant path-averaged crosswind, which corresponds to the path-weight function given by Eq. (8) for single beam divergence.

Figure 13:
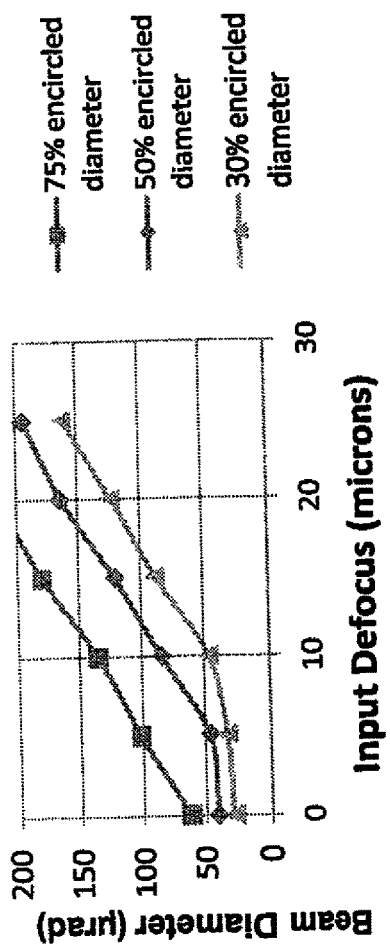
FIG. 13 shows the relationship between input defocus, beam diameter and percent of encircled diameter for a preferred embodiment.

Changing the laser beam divergence and spot size of the laser on the target can be achieved by moving the input fiber over a short distance, parallel to the optical axis of the lens using piezo element. If the input beam is slightly defocused, then the beam in the far field will be expanded. FIG. 13 shows the diameters at which 75%, 50%, and 30% of the energy are captured is plotted as a function of the input defocus for the 50 mm focal length lens. The minimum diameters with no defocus are at the diffraction limit, and the diameter grows roughly linear with defocus.

Figure 14A:
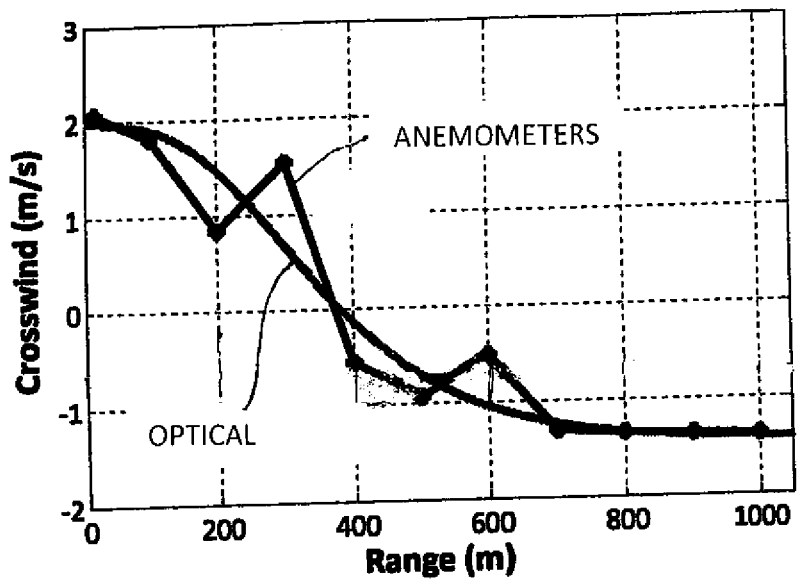
FIGS. 14A and 14B show two comparisons of the crosswind profiles measured with a laser-based wind measurement system (continuous curves) as compared with wind profiles measured with 11 spaced apart ultrasonic anemometers (pluses) at 1 km range.
Figure 14B:
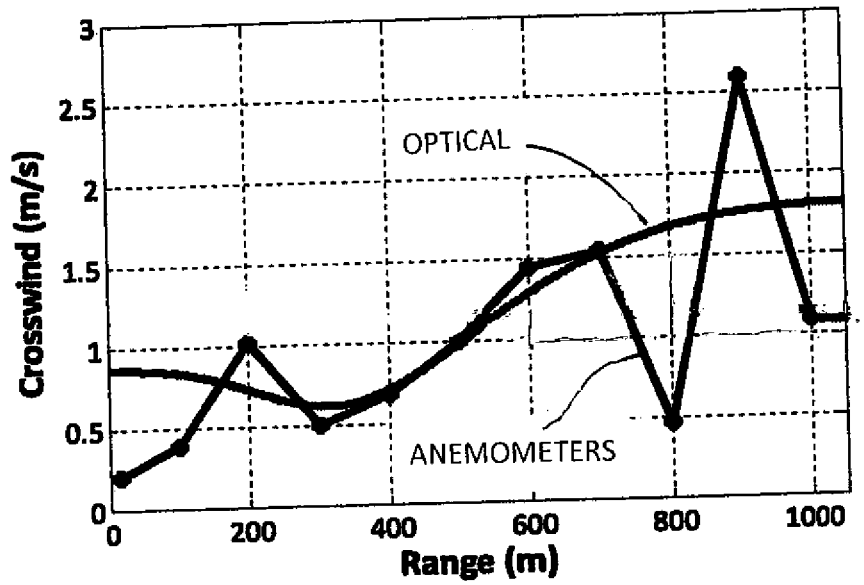

Experimental data validating the crosswind profile measurement technique using variable beam divergence are shown FIGS. 14A and 14B. These figures show experimentally determined crosswind profiles using three beam divergences (n=3): $\varphi_1=100$ μrad, $\varphi_2=200$ μrad and $\varphi_3=300$ μrad (continuous curves) and crosswind profiles measured with 11 spaced apart ultrasonic anemometers (pluses) at 1 km range.

Special Algorithm for One Shot Program

In the course of performance of DARPA's One Shot Program, Applicants discovered that adjusting the beam divergence to measure wind profiles at a variety of ranges along the line of sight required moving parts and, slowed down the measurement process and that better results could be achieved by making an assumption that the wind speed profile did not change substantially along the path between the shooter and the target. These results were confirmed by multiple actual experiments and test at target ranges. Applicants were able to program a tiny FPGA with this special algorithm so as to collect the two channels of scintillation data at rates of 8,100 measurements per channel. This approach resulted in an about 78 percent probability of a one-shot kill of an enemy at a range of 0.934 kilometers and a 65 percent probability at a 1.326 kilometer range. This is the reason why Applicants believe this patent application should remain secret for as long as possible.

Programming the FPGA

As explained in the above embodiment the laser beam reflected from the small spot on the target propagates through the wind, and is sampled by the two apertures, separated by several centimeters. Optics steer the light from the two apertures onto a short wave infrared camera, so that both laser spots are recorded at the same time. The camera is running at approximately 900 frames per second, so each individual image samples the light for 1.11 milliseconds. For each camera image, Applicant's integrate the light pixels into two sets of intensity values, one for each aperture. Applicants record the two light intensity values for each image, for 9 seconds total. This results in 9*900 intensity measurements, for each aperture. While it is possible that the wind changes over 9 seconds, Applicant's actual testing has shown that the changes are almost always not significant. In addition, since the results are updated every 20 milliseconds, any effects of changes during the 9 seconds are greatly minimized. Applicants denote the two light intensity patterns as $f(t)$ and g(t). The laser intensity profiles versus time are recorded and processed using a cross-correlation algorithm.

First, Applicants compute a normalized auto-correlation of each laser intensity profile using the formula:

$$A(s)=\text{Sum}(t=0 \ldots N)[f(t)-favg]*[f(t+s)-favg]/(\text{stdev}\_f*\text{stdev}\_f) \quad (1)$$

where favg is the average value of f(t), and stdev_f is the standard deviation of f(t). The data represented by: "Sum (t=0 . . . N) [f(t)–favg]*[f(t+s)–favg]" is the sum product of all of the f(t)–favg] and all of the [f(t+s)–favg] which is a N×N matrix. This calculation can be made in 50 milliseconds using an ARM Cortex—A9 processor. It is necessary to make the calculation for a variety of s values, since s is going to be used to determine the delay of the scintillation pattern in the down-wind channel as compared to the up-wing pattern.

This is repeated for pattern g(t).

The auto-correlation is used in a zero-crossing method similar to the method described in the Ting-I Wang paper discussed in the background section.

The normalized cross-correlation of f(t) and g(t) is computed using the formula:

$$C(s)=\text{Sum}(t=0 \ldots N)[f(t)-favg]*[g(t+s)-gavg]/(\text{stdev}\_f*\text{stdev}\_g) \quad (2)$$

The cross-correlation C(s) is a curve that is maximum when the two intensities are most correlated. To find the highest correlation, Applicants have investigated in detail two of the methods discussed in the background section: (A) the peak finding method, and (B) the zero-crossing method [Briggs]. It was found experimentally that the zero crossing method is slightly more robust versus noise. The time series intensities are cross-correlated, by shifting the s forward and backward in time, and finding the highest correlation in time. The highest correlation time is interpolated, to find fractional time steps. The cross-wind speed is computed via an equation:

Crosswind speed $v=dX/dt$ where dX is the "effective" separation between the two receive apertures, and dt is the cross-correlation time between the intensity profiles.

The cross-wind algorithm described above requires high speed processing, in order to perform the calculations in real-time. Since the camera runs at 900 frames per second, the video arrives in frame intervals of 1.1 msec. However, the individual pixels arrive at 50 MHz video rate, which corresponds to pixel intervals of 20 nsec. Most computers will not be capable of performing the video calculations in real-time, without dropping data. In this application, all the processing must be performed inside a small unit mounted on a gun, under battery power. The system requires low power draw, and high speed processing, which can only be implemented with a hybrid solution. The video processing is performed by an FPGA, running at 50 MHz. The sensor pixels are summed for each laser spot by the FPGA, and 2 numbers are output for each video frame, transferred to an embedded micro-processor. The FPGA completes the video processing in real-time, and has finished the calculations before the final pixel exits from the camera. The two numbers represent the integrated light intensity for each laser spots. The light intensity is recorded for each video frame, resulting in 2*9*900 recorded values during the laser illumination.

The correlations in equations (1) and (2) require numerous calculations during the 9 seconds of illumination. Every 50 milliseconds three correlations must be calculated with M=900*900 multiplications and additions. During the 9 seconds, the total is 3*2*8*20*M calculations, or 780 million calculations, just for the correlations. After each correlation is completed, the algorithm also requires a zero-crossing search, and interpolation calculations. In order to perform all these calculations in real-time, requires the use of a high-performance micro-processor. We used an ARM Cortex-A9 processor, running with a clock speed of 800 MHz. During the laser illumination, the processor transfers 2 numbers per frame from the FPGA, and stores them in memory. The correlations and other calculations require utilization of nearly every clock cycle, so CPU time scheduling is critical. Applicants avoided using an Operating System, such as Linux, since the background processes would lose control of the CPU intermittently. During laser illumination, Applicants halt all other processes, and reserve the entire CPU for correlation processing. Using these methods, we were able to complete all the calculations in real-time, and report the final wind speed result, immediately after the data acquisition finishes.

Design Layout

FIG. 16 is design layout of a preferred embodiment of the present invention. External sensors included: a magnetic compass 20, a temperature sensor 22, atmosphere pressure sensor 24, a humidity sensor 26, and a GPS receiver 28, all providing measurements required for accurate ballistic predictions. The temperature, pressure and humidity are used to calculate the air density, relevant to determine the drag on the bullet. The magnetic compass and GPS receiver provide the direction of fire and latitude, both necessary to determine the Coriolis drift for a long range ballistic trajectory. For a final test of the present invention, a Remington 783 bolt action rifle was equipped by Trex and Cubic under the DARPA contract as described in FIG. 17. The entire unit is battery operated and was mounted directly on the rifle. Test results of the final testing at a shooting range at Ocotillo Wells, Calif. are described in the next section.

FIG. 18 shows an upgraded version of a brass board built by Applicants in 2012. This document was sent to Dr. Varshmeya
Dec. 16-18, 2014—Ocotillo Wells, Calif.—Final Acceptance Testing A summary of the acceptance test is presented below. Trex's crosswind measuring units met and exceeded the performance requirement of the One Shot XG system which was a hit probability of 60% at the 90% of effective range of the weapon.

| | First Round Hit Probabilities | | |
|---|---|---|---|
| IMS# | Range: 732 meter Round: 308 | Range: 934 meter Round: 308 | Range: 1326 meter Round: 338 |
| 1 | 83% (22 shots) | 75% (20 shots) | |
| 2 | 65% (20 shots) | 70% (20 shots) | |
| 3 | 95% (22 shots) | 75% (20 shots) | |
| 4 | 83% (18 shots) | 65% (20 shots) | 100% (5 shots) |
| 5 | | 65% (20 shots) | |
| 6 | 100% (18 shots) | 100% (20 shots) | 67% (24 shots) |
| 7 | 90% (20 shots) | 75% (20 shots) | 80% (5 shots) |
| 8 | | | 44% (18 shots)/ noisy camera |
| 9 | | 75% (20 shots) | 0% (20 shots)/ Tailwinds (not counted) |
| 10 | | 97% (33 shots) 85% (20 shots) | 0% (20 shots)/ Tailwinds (not counted) |
| 11 | | 85% (20 shots) | 44% (18 shots) |
| 12 | | 70% (20 shots) | 54% (24 shots) |
| Avg. | 86% | ~78% | 65% |

Crosswind Velocity Determination Using Frequency Analysis

A 1972 paper, Ishimaru A, "Temporal frequency spectra of multi-frequency waves in turbulent atmosphere," (IEEE Transactions on Antennas and Propagation, Vol. AP-20, No. 1, January 1972) presents equations for temporal spectra of the amplitude fluctuations of optical waves propagating through turbulence in weak scintillation regime using Taylor's frozen-turbulence hypothesis. The characteristic frequency of turbulence-induced scintillation is related to the crosswind velocity through the following equation $$f_0 = \frac{v}{\sqrt{2\pi\lambda L}} = \frac{v}{2.5\sqrt{\lambda L}} \qquad (12)$$

where $\lambda$ is the wavelength and L is the range. The characteristic frequency is linearly proportional to the crosswind velocity and inverse proportional to the characteristic spatial scale of the scintillation, which is equal to the radius of the first Fresnel zone, $\sqrt{\lambda L}$. For 1 km range and wavelength of 1.55 micro meters, $\sqrt{\lambda L}$=4 cm.

This frequency-based method was implemented by Applicants using one measurement channel of the crosswind sensor prototype. The characteristic frequency of the scintillation was calculated by:
 i) subtracting the mean value and removing the low frequency drift from the time series recorded with single aperture,
 ii) multiplying a time series with Hamming window, and
 iii) performing a fast Fourier transform.

Figure 20B:
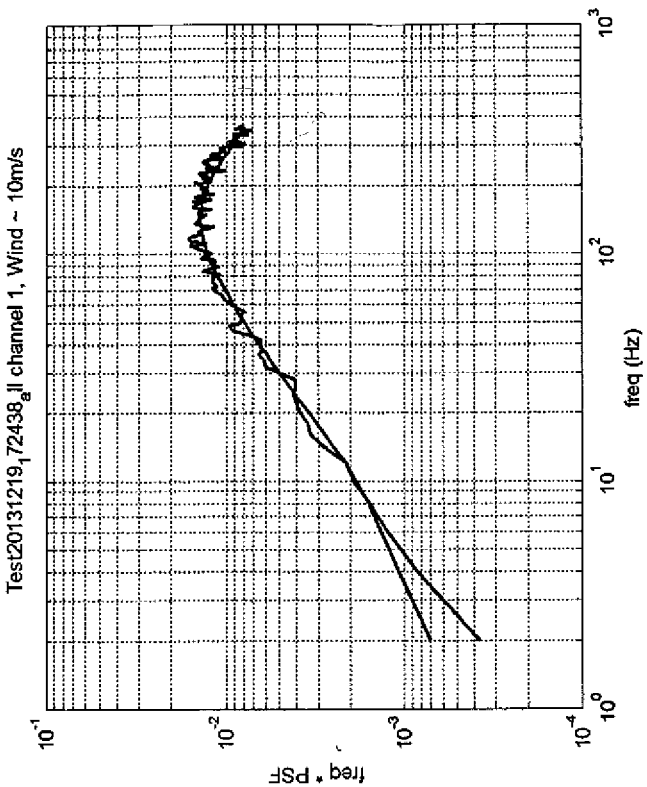
FIGS. 20A and 20B are graphs showing test results of a frequency based technique for measuring crosswind speeds where the wind speed is 10 m/s and there is weak scintillation.
Figure 20A:
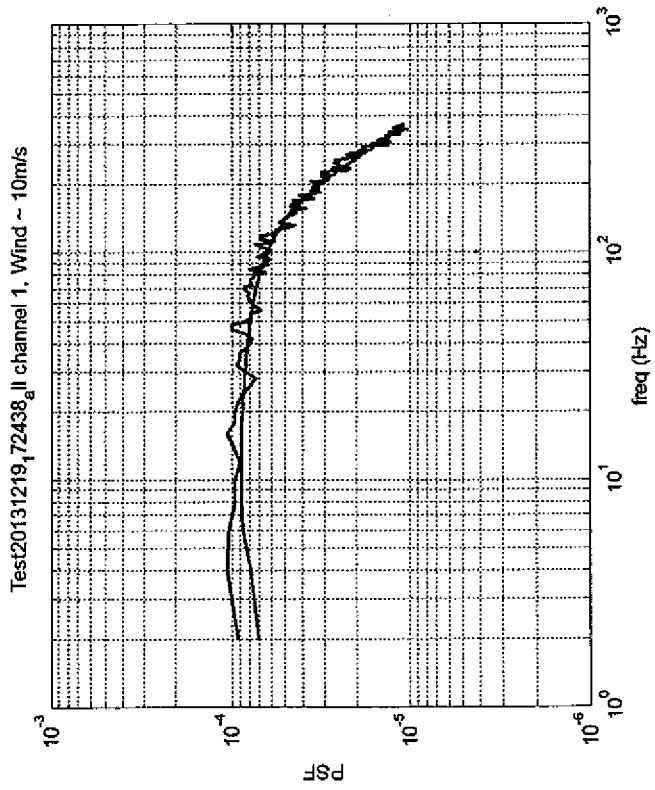

Applicants conducted a series of actual tests of this frequency based technique for measuring crosswind speed. When the power spectral density (PSD) of the scintillation of a laser return was calculated, the PSD was multiplied by the frequency and normalized by the variance of the scintillation. The normalized product, frequency x PSD(f)/variance, has a peak value at the characteristic frequency of the scintillation, which is directly proportional to the crosswind velocity. As an example, FIG. 19A shows the measured values of the point spread function in the frequency range of $10^0$ Hz to $10^3$ Hz and FIG. 19B shows the product of the PSF times the frequency as a function of frequency between $10^0$ Hz to $10^3$ Hz with a wind speed of 4 meters per second. FIG. 20A shows the measured values of the point spread function in the frequency range of $10^0$ Hz to $10^3$ Hz and FIG. 19B shows the product of the PSF times the frequency as a function of frequency between $10^0$ Hz to $10^3$ Hz with a wind speed of 10 meters per second. Applicants confirmed that the maximum frequency of the product, frequency x PSD(f)/variance, is linearly proportional to the crosswind velocity with wind speeds in the range of 2 to 10 meters per second. These tests were conducted by Applicants and the results shown on FIGS. 19A through 20B were delivered to DARPA in January 2014 where Dr. Varshnenya was Project Manager as indicated on the drawings. Information about this work by trex to estimate crosswind speed based on frequency of a beam reflected from a target was apparently not disclosed to the USPTO in connection with the prosecution of the application Ser. No. 14/450,076 (U.S. Pat. No. 9,157,701).

Eq. (12) has a limitation. It is based on weak scintillation theory. Therefore, it is valid only when the scintillation index $\sigma_I^2$=0.124 $k^{7/6}L^{11/6}C_n^2$<1. At the same time, in the regime of strong scintillation, $\sigma_I^2$=0.124 $k^{7/6}L^{11/6}C_n^2$>>1, a spatial correlation scale of turbulence-induced scintillation is equal to the spatial coherence scale, $\rho_0$=(1.45$C_n^2$ $k^2L$)$^{-3/5}$ (see. L. Andrews and Phillips R. "Laser Beam Propagation through Random Media", SPIE Press, 2005, Chapter 9.7). Consequently, in the strong scintillation regime $\sigma_I^2$>>1, Eq. (12) has a form $$f_0 = \frac{v}{\sqrt{2\pi}\,\rho_0} = 0.5v\,(C_n^2k^2L)^{0.6}. \qquad (13)$$

And the crosswind velocity is given by equation v=2 ($C_n^2$ $k^2L$)$^{-0.6}f_0$. For wavelength $\lambda$=1.55 μm (k=2π/$\lambda$) at L=1 km and $C_n^2$<$10^{-13}$, spatial correlation scale is $\sqrt{\lambda L}$=4 cm. When $C_n^2$>$10^{-13}$, at the same range spatial correlation scale is equal to $\rho_0$ and could be less than 1 cm. Applicants did not conduct formal test with strong scintillation; however, Applicants are confident the equation (13) is reliable in the regime of strong scintillation.

In the intermediate regime $\sigma_I^2$~1, when conditions that correspond to two asymptotic regimes, $\sigma_I^2$<1 and $\sigma_I^2$>>1, are not satisfied, an analytical expression for the spatial correlation scale of scintillation and characteristic frequency is not available in the theory. This means a single aperture frequency-based method of crosswind determination is inferior to the two aperture systems discussed above. Indeed, as opposed to the expression for time-lagged cross covariance function for two-aperture receivers (Eq. (1)), which is based on saturation-resistant theory and is valid in weak, strong, and intermediate scintillation regimes, Eqs. (12) and (13) are available only for two asymptotic regimes. The fact that spatial correlation scale of scintillation depends on refractive index structure characteristic $C_n^{2'}$ when condition $\sigma_I^2=0.124 k^{7/6}L^{11/6}C_n^2<1$ is not satisfied, and analytical expression for characteristic frequency of scintillation in the intermediate regime $\sigma_I^2\sim1$ is not known, makes this frequency-based, single-aperture method less reliable as compared to the dual-aperture cross-covariance method described above. A direct comparison of the single aperture frequency-based method and Briggs method based on the use of two aperture receivers showed that Briggs method produces more accurate and robust results and out-performs a single-aperture, frequency-based approach. Nevertheless, there may be situations where a single aperture frequency bases system of crosswind measurements to correct offset aim points may be preferred and Applicants have directed some of their claims at this technique.

Angular Profile Analysis of the Laser Beam Spot

Figure 21B:
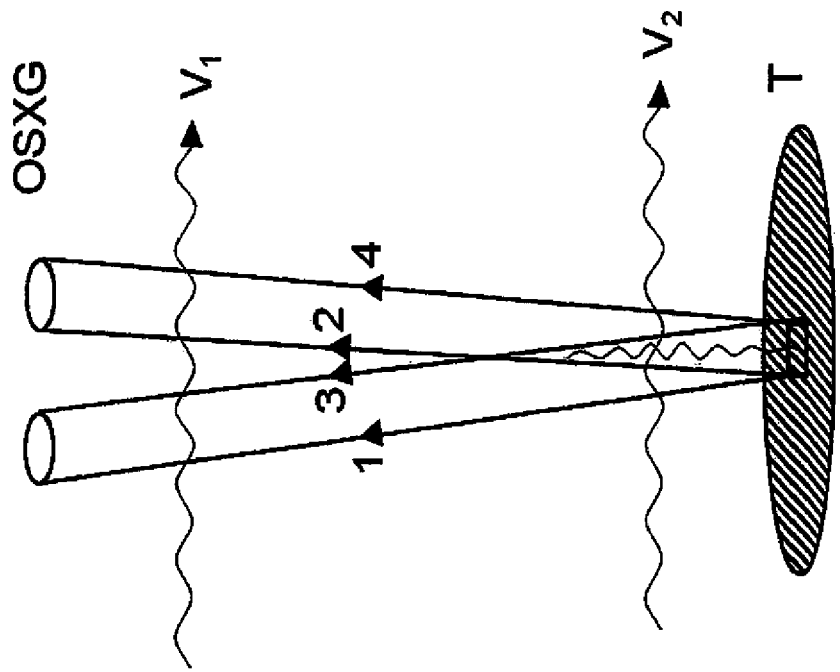
FIGS. 21A and 21B provide physical interpretation for this result described if FIG. 22.
Figure 21A:
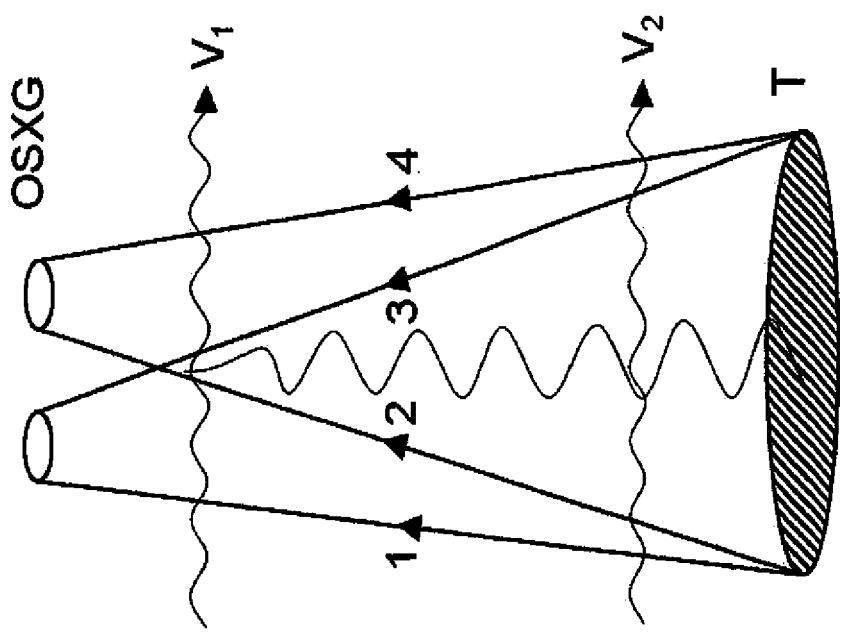
Figure 22:
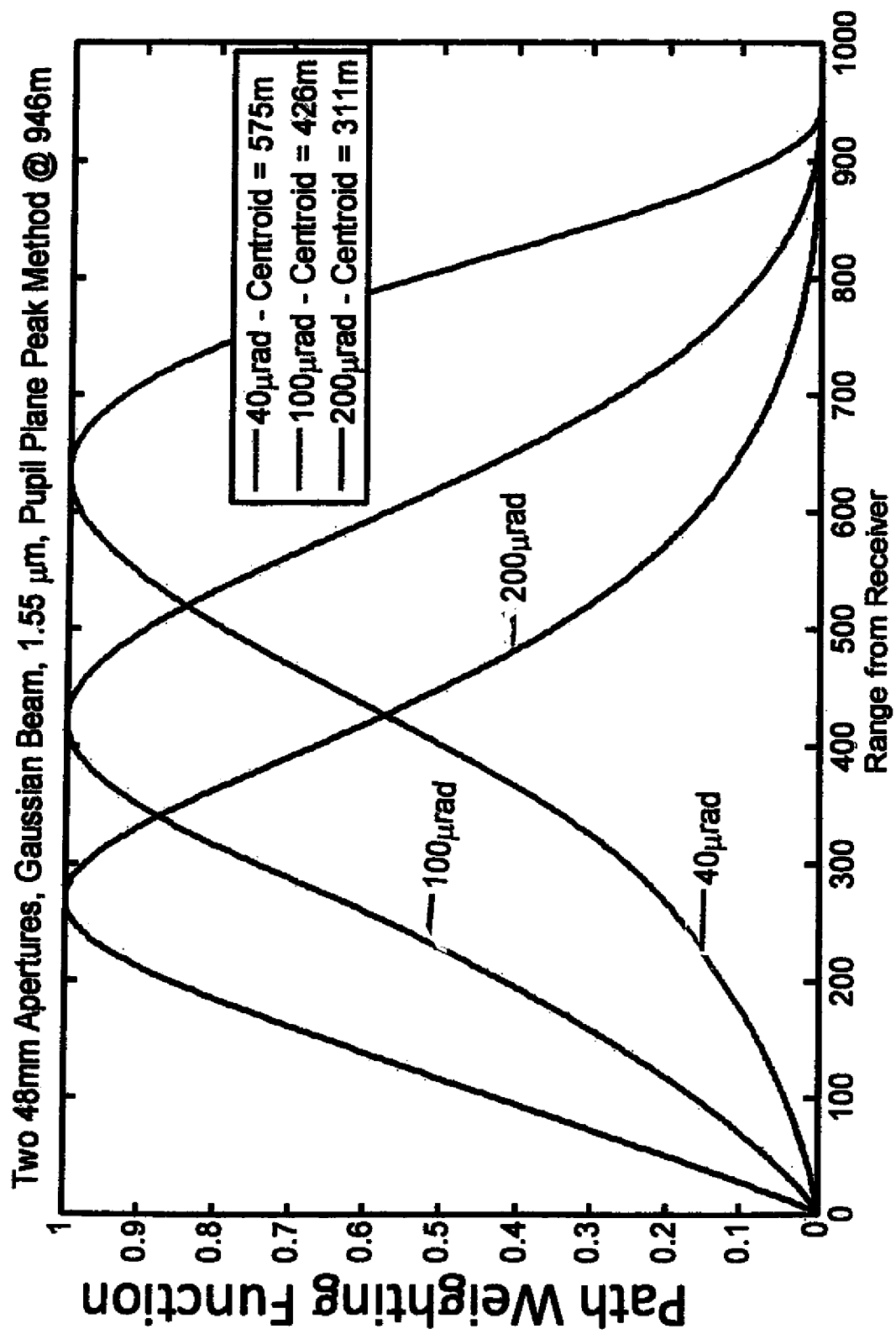
FIG. 22 depicts the path-weighting functions for three angular sizes of a secondary source at the target at 1 km range.

A method of crosswind profile measurements using variable beam divergence can be implemented in different ways, which include: i) moving the input fiber over a short distance to change a radius of curvature of the wavefront and laser beam divergence and ii) a rotating wheel with different lenses that change a wavefront curvature of a laser beam and laser beam divergence. A third approach for implementing variable beam divergence concept is based on analysis of angular profile of the beam spot in the image plane of the camera. This approach has an advantage that using single divergence of a laser beam that illuminates the target, a secondary source at the target with different angular size can be created in the software by summing up pixels in different areas. For example: if an angular pixel size is 20 micro radians, then by summing up 2×2 pixels, one can create a secondary source with angular size of 40 micro radians. By summing up 5×5 pixels and 10×10 pixels, two secondary sources with angular size of 100 micro radians and 200 micro radians will be created. This software based method also permits sampling crosswind velocity at different locations along the line of sight and determining crosswind profile. FIG. 22 depicts the path-weighting functions for three angular sizes of a secondary source at the target at 1 km range. It is seen that when an angular size of a secondary source at the target increases, the peak of the path-weighting is shifted toward the shooter. FIGS. 21A and 21B provide physical interpretation for this result. These figures show that when the angular size of the secondary source at the target increases (FIG. 21A), the common turbulence volume viewing by two receiving channels increases and extends toward the shooter. The limitation of this software-based approach, as compared to the hardware-based methods of changing beam divergence, is that in the software-based method the signal-to-noise ratio (SNR) decreases when small number of pixels in the image of the laser spot is summed up, whereas for the hardware based method, the SNR for all beam divergences stays the same. FIG. 22 shows three path-weighting functions for different angular size of the laser spot created in the software in the image plane of the camera.

Integrated System and Method to Provide a Weighted Average Path-Weighted Crosswind A preferred embodiment of the present is an integrated system method to provide a weighted average path-weighted crosswind. Three methods of crosswind determination including 1) dual aperture receiver with variable beam divergence, or angular profile analysis of the laser spot, to generate multiple path-weighting functions; 2) single aperture receiver to measure an average frequency of signal fluctuations caused by scintillation; and 3) single aperture receiver to record both a field image of the laser spot at the target and a de-magnified image of an entrance pupil can be used independently, or can be implemented using an integrated hardware system and used simultaneously to provide multiple estimates of the crosswind magnitude and direction.

An integrated system encased in a housing comprising: an optical transmitter; an optical receiver; a display device; and a processor. The optical transmitter produces a collimated laser beam to illuminate a spot on the target. The optical receiver comprises first and second wind measurement channels separated in a horizontal direction by a predetermined distance to receive optical signals from light transmitted by the optical transmitter and scattered back from a target, and convert the optical signals to obtain time varying electrical signals. Each optical receiver includes an objective lens that collects light, which is scattered from a laser spot illuminated on a target by the optical receiver, and a beam splitter, which splits received light beam into two beams: one beam forms a field image of the laser spot on a receiver, whereas a second beam, which passes through collimated lens, forms a de-magnified image of an entrance pupil of the objective lens.

The processor processes four time varying electrical signals from the first and second wind measurements channels to calculate the auto-covariance and cross-covariance and average frequencies of the four corresponding signals. Two signals from each channel correspond to the field image of the laser spot and de-magnified image of an entrance pupil of the objective lens to determine the time delays from which a path-weighted average crosswind is calculated, and calculate an average frequency of signal fluctuations caused by scintillation fades proportional to the crosswind. Five estimates of the crosswind magnitude are calculated from 1) auto-covariance and cross-covariance of the two signals from first and second measurement channels that correspond to the field image of a laser spot; 2) two estimates of the crosswind magnitude are calculated using de-magnified images of an entrance pupil of the objective lens in the first and second channel (single aperture technique), and 3) two estimates of the crosswind magnitude are determined by calculating an average frequency of signal fluctuations caused by scintillation in the first and second channels. A crosswind direction is determined from the sign of the peak of the cross-covariance of the two signals from first and second measurement channels.

Using five estimates of the crosswind magnitude obtained from different measurements, a weighted average of the path-weighted crosswind magnitude is calculated:

$$V_a = \sum_{i=1}^{5} \frac{1}{\omega_i} v_i \quad (14)$$

which has a path-weighted function that closely matches the Ballistic Influence Function shown in FIG. 7 for 1.5 km range. In Eq. (14) $v_i$ is the crosswind magnitude estimated using one measurement technique and $\omega_i$ is a relative weight of this estimate in the weighted average $V_a$. The optimal weights $\omega_i$ for crosswind magnitudes $v_i$ are determined by combining individual path-weighting functions for five measurement techniques with the Ballistic Influence Function shown in FIG. 7.

Variations

Described above are preferred embodiments of the present invention. Persons skilled in the art of crosswind measurement and correction will recognize that many modifications and additions could be made the above descriptions within the general scope of the invention.

For example, in addition to the peak method and the crossing pjoint method the other techniques described in the Wang paper may be substituted.

Also for each sniper rifle produced the manufacturer, supplier, owner or users of the rifle will probably want to establish a series of tests to determine which of the available techniques produces the beat results. Or for individual rifles some combination may produce the best results. It is also likely that application of more than one individual techniques could be combined with each technique giving an appropriate weight to each technique. For example equation (14) could be programmed into the processor as explained above Using five estimates of the crosswind magnitude obtained from different measurements, a weighted average of the path-weighted crosswind magnitude may be calculated using:

$$V_a = \sum_{i=1}^{5} \frac{1}{\omega_i} v_i \quad (14)$$

which has a path-weighted function that closely matches a predetermined Ballistic Influence Function based on ranges to the target. In Eq. (14) $v_i$ is the crosswind magnitude estimated using one measurement technique and $\omega_i$ is a relative weight of this estimate in the weighted average $V_a$. The optimal weights $\omega_i$ for crosswind magnitudes $v_i$ may be determined by combining individual path-weighting functions for five measurement techniques to closely match the predetermined Ballistic Influence Function.

Therefore, the scope of the present should be determined by the appended claims and not by the specific descriptions provided above.

What is claimed is:

1. A portable integrated sniper system encased in a housing, said system adapted for transmitting and receiving short wave infrared (SWIR) light and designed to nullify a target at a range of at least a kilometer through an atmosphere with the SWIR light producing scintillations defining angular correlation scale of intensity fluctuations) ($\sqrt{\lambda/L}$), where $\lambda$ is a wavelength of the SWIR light and L is a distance to the target, and defining intensity correlation scale of intensity fluctuations ($\sqrt{\lambda L}$) said system comprising:
   A) an optical transmitter designed to transmit SWIR light, comprising:
   1) a dual-mode infrared laser, adapted to transmit pulsed and continuous laser beam directed to a target to produce:
   a) a series of spots on the target in pulse mode to permit determination of range to the target,
   b) a single spot illumination in continuous mode on the target lasting at least nine milliseconds,
   2) a collimator adapted to produce an angular divergence (6) in the laser beam that exceeds the angular correlation scale of intensity fluctuations ($\sqrt{\lambda L}$) at the target caused by scintillations,
   B) a SWIR video camera adapted to monitor scintillation measurements of two separate return laser beams reflected from the single spot,
   C) a two-telescope optical receiver, comprising a photodiode and a video camera and comprising:
   1) first telescope defining a receiver aperture and including a focusing lens defining an objective lens diameter D, wherein D does not exceed $\sqrt{\lambda L}$;
   2) a beam splitter adapted to split light, reflected from the target received by the first telescope, between:
   a) the photodiode and
   b) the SWIR video camera,
   3) a second telescope defining a receiver aperture and including a focusing lens defining an objective lens diameter D, wherein D does not exceed $\sqrt{\lambda L}$; and reflecting optics to transmit light received by the second telescope to the SWIR video camera,
   D) a processor programmed with an algorithm for:
   1) analyzing signals recorded by the SWIR video camera corresponding to SWIR light collected by the two telescopes defining a first and second approximately parallel reflected laser beams and defining a first and a second wind measurement channels,
   2) and calculating the spatial-temporal alto-covariance and cross-covariance of intensity fluctuations between the first and second reflected laser beams and determining path weighted average crosswinds from the scintillation measurements of the two reflected laser beams, and
   E) a display device for displaying an offset aim point, wherein:
   1) light reflected from the target and collected by the first and second telescopes, each telescope defining a center line of each of the two approximately parallel reflected laser beams and the center lines are separated by a predetermined distance and that predetermined distance is less than $2\sqrt{\lambda L}$, so that the crosswind:
   2) can be determined from scintillation data produced only from the two laser beams reflected from the target and collected by the two telescopes,
   3) the processor processes time varying electrical signals from the first and second wind measurement channels to determine a time delay from which a path-weighted average crosswind toward the target is calculated,
   4) the processor calculates, based on the path-weighted average crosswind and range, an aim point offset and confidence circle, and
   5) the offset aim point is displayed on the display device.

2. The system as in claim 1 wherein the processor also calculates, based on the path-weighted average crosswind, the offset aim point and a confidence circle; and the offset aim point and the confidence circle are displayed on the display device.

3. The system as in claim 1 wherein the optical transmitter comprises a fiber laser defining an exit aperture and at least one collimating lens positioned at a distance from the exit aperture.

4. The system as in claim 1 wherein the collimated laser beam is intentionally made slightly divergent within a range of 25 micro-radians to 300 micro-radians in order to calculate the path weighted crosswind.

5. The system as in claim 4 and further comprising divergence changing optical components to produce a plurality of divergent laser beam so as to produce a plurality of different spot sizes on the target.

6. The system as in claim 5 wherein the divergence changing optical components comprises a plurality of optical lenses.

7. The system as in claim 6 wherein the plurality of optical lenses are mounted on a wheel.

8. The system as in claim 4 the divergence changing optical components comprises components to change the distance between the exit aperture of the fiber laser and the at least one optical lens.

9. The system as in claim 8 the optical transmitter further comprises a motorizes stage adapted to move the fiber laser.

10. The system as in claim 1 wherein the processor is programmed to calculate the path average crosswind by determining a frequency of the signal intensity with respect to each of the first and second wind measurement channels.

11. The system as in claim 1 wherein the optical signals from the first measurement channel is de-magnified to produce two images in the receiver corresponding to two parallel beams and the optical signals from the second measurement channel is de-magnified to produce two images in the receiver corresponding to two parallel beams processor is programmed to determine a separate path weighted average windspeed for each of the two measurement channels.

12. The system as in claim 1 wherein the processor is a FPGA programmed to collect two channels of scintillation data at rates of 8,100 measurements per channel.

13. The system as in claim 12 wherein preferred embodiments produce a probability kill rate of about 78 percent of a kill or an enemy at a range of 0.934 kilometers range and a 65 percent probability at a 1,326 kilometer range.

14. The system as in claim 1 wherein the system also comprises a magnetic compass, a temperature sensor, a pressure sensor, a humidity sensor, and a GPS sensor and the processor and algorithm are adapted to analyze signals from each of the sensors to calculate appropriate adjustments to the offset aim point and the confidence circle.

* * * * *